(12) United States Patent
Suzuki et al.

(10) Patent No.: US 11,537,140 B2
(45) Date of Patent: Dec. 27, 2022

(54) MOBILE BODY, LOCATION ESTIMATION DEVICE, AND COMPUTER PROGRAM

(71) Applicant: Nidec-Shimpo Corporation, Nagaokakyo (JP)

(72) Inventors: Shinji Suzuki, Kyoto (JP); Tetsuo Saeki, Kyoto (JP); Masaji Nakatani, Kyoto (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 112 days.

(21) Appl. No.: 16/639,137

(22) PCT Filed: Aug. 14, 2018

(86) PCT No.: PCT/JP2018/030307
§ 371 (c)(1),
(2) Date: Feb. 14, 2020

(87) PCT Pub. No.: WO2019/044499
PCT Pub. Date: Mar. 7, 2019

(65) Prior Publication Data
US 2020/0233431 A1    Jul. 23, 2020

(30) Foreign Application Priority Data

Sep. 4, 2017    (JP) .............................. JP2017-169727

(51) Int. Cl.
*G05D 1/02*    (2020.01)
*G05D 1/00*    (2006.01)
*G05D 1/08*    (2006.01)

(52) U.S. Cl.
CPC ......... *G05D 1/0274* (2013.01); *G05D 1/0038* (2013.01); *G05D 1/0891* (2013.01)

(58) Field of Classification Search
CPC ... G05D 1/0274; G05D 1/0038; G05D 1/0891
See application file for complete search history.

(56) References Cited

U.S. PATENT DOCUMENTS 5,850,197 A  * 12/1998  Schipper ............... G01S 5/0247
                                                          342/417
2007/0027612 A1 * 2/2007  Barfoot .................... G08G 1/20
                                                          701/420
2017/0010100 A1    1/2017  Takeuchi et al.

FOREIGN PATENT DOCUMENTS

CN    107276920 A   * 10/2017 ......... H04L 47/2433
JP    2008-250906 A    10/2008
(Continued)

OTHER PUBLICATIONS

English Translation of "JP201797537".*
(Continued)

*Primary Examiner* — Jess Whittington
*Assistant Examiner* — Shahira Baajour
(74) *Attorney, Agent, or Firm* — Keating & Bennett

(57) ABSTRACT

A device includes an external sensor to scan an environment so as to periodically output scan data, a storage to store an environmental map, and a location estimation device to match the sensor data against the environmental map read from the storage so as to estimate a location and an attitude of the vehicle. The location estimation device determines predicted values of a current location and a current estimation of the vehicle in accordance with a history of estimated locations and estimated attitudes of the vehicle, and performs the matching by using the predicted values.

4 Claims, 16 Drawing Sheets

(56) References Cited

FOREIGN PATENT DOCUMENTS

| JP | 2009-159784 A | 7/2009 |
| JP | 2009-276823 A | 11/2009 |
| JP | 2014-203144 A | 10/2014 |
| JP | 2017-021791 A | 1/2017 |
| JP | 2017-097537 A | 6/2017 |

OTHER PUBLICATIONS

English Translation of "JP2014203144".*
English Translation of "JP2009276823".*
English Translation of CN-107276920-A.*
Official Communication issued in International Patent Application No. PCT/JP2018/030307, dated Oct. 23, 2018.

* cited by examiner

MOBILE BODY, LOCATION ESTIMATION DEVICE, AND COMPUTER PROGRAM

CROSS REFERENCE TO RELATED APPLICATIONS

This is a U.S. national stage of PCT Application No. PCT/JP2018/030307, filed on Aug. 14, 2018, and priority under 35 U.S.C. § 119(a) and 35 U.S.C. § 365(b) is claimed from Japanese Application No. 2017-169727, filed Sep. 4, 2017; the entire disclosures of each of which are hereby incorporated herein by reference.

1. FIELD

The present disclosure relates to vehicles, location estimation devices, and computer programs.

2. BACKGROUND

Vehicles capable of autonomous movement, such as automated guided vehicles (or automated guided cars) and mobile robots, are under development.

Japanese Laid-Open Patent Publication No. 2008-250906 discloses a mobile robot that performs localization by matching a preliminarily prepared map against a local map acquired from a laser range finder.

In performing the matching, the mobile robot disclosed in Japanese Laid-Open Patent Publication No. 2008-250906 uses an output from an optical fiber gyro and an output from a rotary encoder (hereinafter simply referred to as an "encoder") attached to a motor or a driving wheel, in order to estimate its own position.

SUMMARY

An example embodiment of the present disclosure provides a vehicle that is able to perform localization without using an output from an encoder.

In a non-limiting and illustrative example embodiment, a vehicle according to the present disclosure includes an external sensor to scan an environment so as to periodically output scan data, a storage to store an environmental map, and a localization device to match the sensor data against the environmental map read from the storage so as to estimate a location and an attitude of the vehicle. The localization device determines predicted values of a current location and a current estimation of the vehicle in accordance with a history of estimated locations and estimated attitudes of the vehicle, and performs the matching by using the predicted values.

In a non-limiting and illustrative example embodiment according to the present disclosure, a location estimation device is a location estimation device of a vehicle. The location estimation device is connected to an external sensor to scan an environment so as to periodically output scan data, and a storage to store an environmental map. The location estimation device includes a processor and a memory to store a computer program to operate the processor. The processor executes, in accordance with a command included in the computer program determining predicted values of a current location and a current estimation of the vehicle in accordance with a history of estimated locations and estimated attitudes of the vehicle, and executing, by using the predicted values, matching of the sensor data against the environmental map read from the storage device so as to estimate the location and attitude of the vehicle.

In a non-limiting and illustrative example embodiment according to the present disclosure, a non-transitory computer readable medium includes a computer program to be used in the location estimation device described above.

With a vehicle according to an example embodiment of the present disclosure, it is possible to perform localization without using an output from an encoder.

The above and other elements, features, steps, characteristics and advantages of the present disclosure will become more apparent from the following detailed description of the example embodiments with reference to the attached drawings.

DETAILED DESCRIPTION

Terminology

Figure 1:
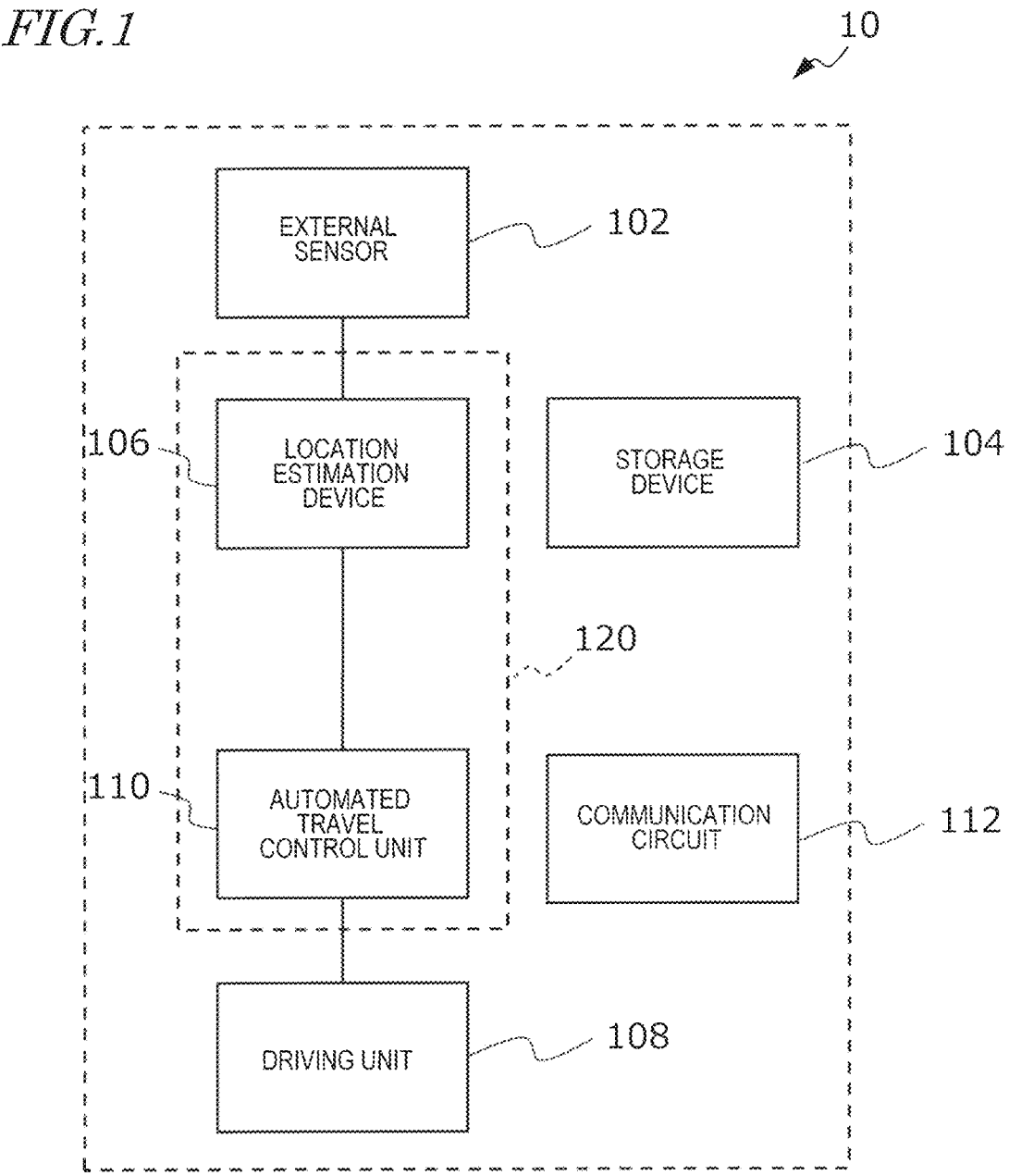
FIG. 1 is a diagram illustrating a configuration of an example embodiment of a vehicle according to the present disclosure.

The term "automated guided vehicle" (AGV) refers to an unguided vehicle that has cargo loaded on its body manually or automatically, performs automated travel to a designated place, and then has the cargo unloaded manually or automatically. The term "automated guided vehicle" encompasses an unmanned tractor unit and an unmanned forklift.

The term "unmanned" refers to the absence of need for a person to steer a vehicle, and does not preclude an automated guided vehicle from carrying a "person (who loads/unloads cargo, for example)".

The term "unmanned tractor unit" refers to an unguided vehicle that performs automated travel to a designated place while towing a car on which cargo is loaded manually or automatically and from which cargo is unloaded manually or automatically.

The term "unmanned forklift" refers to an unguided vehicle that includes a mast for raising and lowering, for example, a fork for cargo transfer, automatically transfers cargo on, for example, the fork, and performs automated travel to a designated place so as to perform an automatic cargo-handling operation.

The term "unguided vehicle" refers to a vehicle including a wheel and an electric motor or an engine to rotate the wheel.

The term "vehicle" refers to a device that moves, while carrying a person or cargo on board, the device including a driving unit (such as a wheel, a two-legged or multi-legged walking device, or a propeller) to produce a traction for movement. The term "vehicle" according to the present disclosure encompasses not only an automated guided vehicle in a strict sense but also a mobile robot, a service robot, and a drone.

The term "automated travel" encompasses travel based on a command from an operation management system of a computer to which an automated guided vehicle is connected via communications, and autonomous travel effected by a controller included in an automated guided vehicle. The term "autonomous travel" encompasses not only travel of an automated guided vehicle to a destination along a predetermined path but also travel that follows a tracking target. An automated guided vehicle may temporarily perform manual travel that is based on an instruction from an operator. The term "automated travel" usually refers to both of travel in a "guided mode" and travel in a "guideless mode". In the present disclosure, however, the term "automated travel" refers to travel in a "guideless mode".

The term "guided mode" refers to a mode that involves placing guiding objects continuously or continually, and guiding an automated guided vehicle by using the guiding objects.

The term "guideless mode" refers to a mode that involves guiding without placing any guiding objects. The automated guided vehicle according to an example embodiment of the present disclosure includes a localization device and is thus able to travel in a guideless mode.

The term "location estimation device" refers to a device to estimate a location of the device itself on an environmental map in accordance with sensor data acquired by an external sensor, such as a laser range finder.

The term "external sensor" refers to a sensor to sense an external state of a vehicle. Examples of such an external sensor include a laser range finder (which may also be referred to as a "laser range scanner"), a camera (or an image sensor), light detection and ranging (LIDAR), a millimeter wave sensor, an ultrasonic sensor, and a magnetic sensor.

The term "internal sensor" refers to a sensor to sense an internal state of a vehicle. Examples of such an internal sensor include a rotary encoder (which may hereinafter be simply referred to as an "encoder"), an acceleration sensor, and an angular acceleration sensor (e.g., a gyroscope sensor).

The term "SLAM" is an abbreviation for Simultaneous Localization and Mapping and refers to simultaneously carrying out localization and generation of an environmental map.

Basic Configuration of Vehicle According to Present Disclosure

See FIG. 1. In an illustrative example embodiment illustrated in FIG. 1, a vehicle 10 according to the present disclosure includes an external sensor 102 to scan an environment so as to periodically output scan data. A typical example of the external sensor 102 is a laser range finder (LRF). The LRF periodically emits, for example, an infrared or visible laser beam to its surroundings so as to scan the surrounding environment. The laser beam is reflected off, for example, a surface of a structure, such as a wall or a pillar, or an object placed on a floor. Upon receiving reflected light of the laser beam, the LRF calculates a distance to each point of reflection and outputs data on a result of measurement indicative of the location of each point of reflection. The location of each point of reflection is reflective of a direction in which the reflected light comes and a distance that is traveled by the reflected light. The data on the result of measurement (i.e., scan data) may be referred to as "environmental measurement data" or "sensor data".

The external sensor 102 performs environmental scanning, for example, on an environment in the range of 135 degrees to the right and to the left (which is 270 degrees in total) with respect to the front surface of the external sensor 102. Specifically, the external sensor 102 emits pulsed laser beams while changing the direction of each laser beam for each predetermined step angle within a horizontal plane, and then detects reflected light of each laser beam so as to measure a distance. A step angle of 0.3 degrees allows to obtain measurement data on a distance to a point of reflection in a direction determined by an angle corresponding to a total of 901 steps. In this example, the external sensor 102 scans its surrounding space in a direction substantially parallel to the floor surface, which means that the external sensor 102 performs planar (or two-dimensional) scanning. The external sensor, however, may perform three-dimensional scanning.

A typical example of scan data may be expressed by position coordinates of each point included in a point cloud acquired for each round of scanning. The position coordinates of each point are defined by a local coordinate system that moves together with the vehicle 10. Such a local coordinate system may be referred to as a "vehicle coordinate system" or a "sensor coordinate system". In the present disclosure, the origin point of the local coordinate system fixed to the vehicle 10 is defined as the "location" of the vehicle 10, and the orientation of the local coordinate system is defined as the "attitude" of the vehicle 10. The location and attitude may hereinafter be collectively referred to as a "pose".

When represented by a polar coordinate system, scan data may include a numerical value set that indicates the location of each point by the "direction" and "distance" from the origin point of the local coordinate system. An indication based on a polar coordinate system may be converted into an indication based on an orthogonal coordinate system. The following description assumes that scan data output from the external sensor is represented by an orthogonal coordinate system, for the sake of simplicity.

The vehicle 10 includes a storage device 104 to store an environmental map, and a location estimation device (or localization) 106. The environmental map may be divided into a plurality of maps. The location estimation device 106 matches the scan data acquired from the external sensor 102 against the environmental map read from the storage device 104 so as to estimate the location and attitude (i.e., the pose) of the vehicle 10. This matching may be referred to as "pattern matching" or "scan matching" and may be executed in accordance with various algorithms. A typical example of a matching algorithm is an iterative closest point (ICP) algorithm.

In the illustrated example, the vehicle 10 further includes a driving unit 108, an automated travel control unit 110, and a communication circuit 112. The driving unit 108 is a unit to generate a traction necessary for the vehicle 10 to move. Examples of the driving unit 108 include a wheel (or a driving wheel) to be rotated by an electric motor or an engine, and a two-legged or multi-legged walking device to be actuated by a motor or other actuator. The wheel may be an omnidirectional wheel, such as a Mecanum wheel. The vehicle 10 may be a vehicle that moves in the air or water, or a hovercraft. The driving unit 108 in this case includes a propeller to be rotated by a motor.

The automated travel control unit 110 operates the driving unit 108 so as to control conditions (such as velocity, acceleration, and the direction of movement) for movement of the vehicle 10. The automated travel control unit 110 may move the vehicle 10 along a predetermined traveling path, or move the vehicle 10 in accordance with a command provided from outside. When the vehicle 10 is in motion or at rest, the location estimation device 106 calculates an estimated value of the location and attitude of the vehicle 10. The automated travel control unit 110 controls the travel of the vehicle 10 by referring to the estimated value.

The location estimation device 106 and the automated travel control unit 110 may be collectively referred to as a "travel control unit 120". The travel control unit 120 may include a processor and a memory storing a computer program to control the operation of the processor. The processor and memory just mentioned may be implemented by one or more semiconductor integrated circuits.

The communication circuit 112 is a circuit through which the vehicle 10 is connected to an external management device, another vehicle(s), or a communication network (which includes, for example, a mobile terminal of an operator) so as to exchange data and/or commands therewith.

Environmental Map

Figure 2:
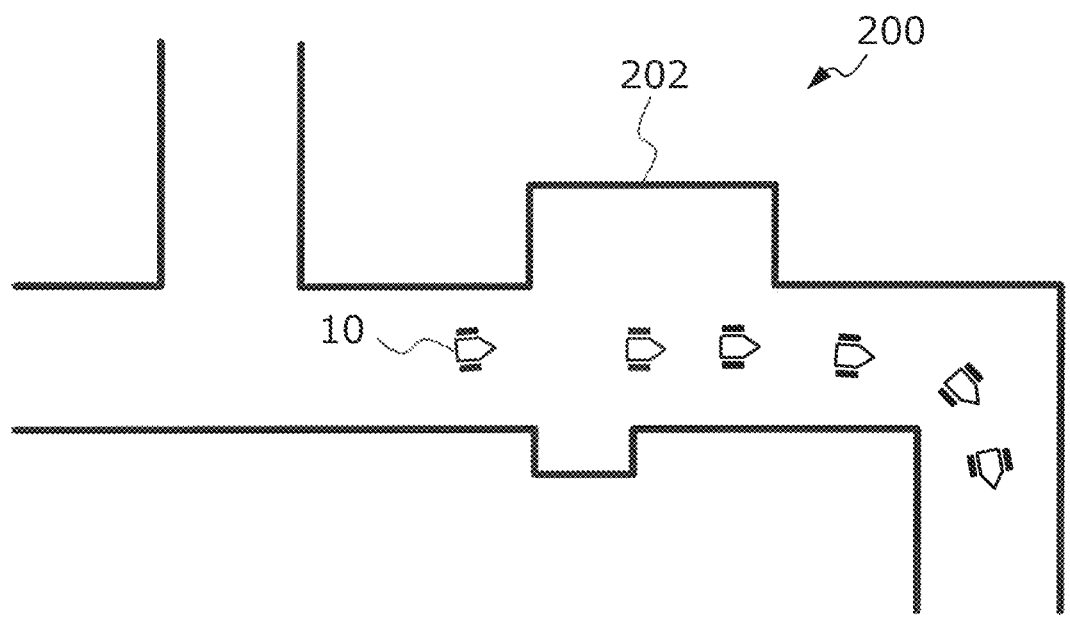
FIG. 2 is a planar layout diagram schematically illustrating an example of an environment in which the vehicle moves.

FIG. 2 is a planar layout diagram schematically illustrating an example of an environment 200 in which the vehicle 10 moves. The environment 200 is part of a wider environment. The thick straight lines in FIG. 2 indicate, for example, a fixed wall 202 of a building.

Figure 3:
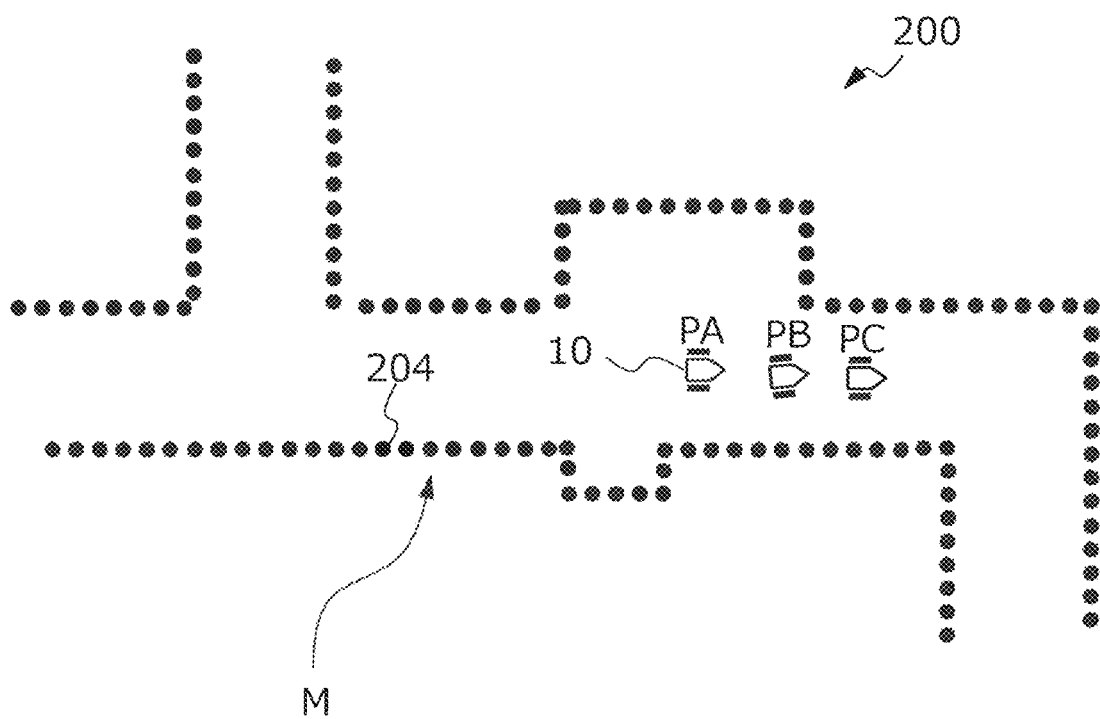
FIG. 3 is a diagram illustrating an environmental map of the environment illustrated in FIG. 2.

FIG. 3 is a diagram illustrating a map (i.e., an environmental map M) of the environment 200 illustrated in FIG. 2. Each dot 204 in FIG. 3 is equivalent to an associated point in a point cloud included in the environmental map M. In the present disclosure, the point cloud in the environmental map M may be referred to as a "reference point cloud", and a point cloud in scan data may be referred to as a "data point cloud" or a "source point cloud". Matching involves, for example, effecting positioning of scan data (or data point cloud) with respect to the environmental map (or reference point cloud) whose location is fixed. Specifically, matching to be performed using an ICP algorithm involves selecting pairs of corresponding points included in a reference point cloud and a data point cloud, and adjusting the location and orientation of the data point cloud so that a distance (or error) between the points of each pair is minimized.

In FIG. 3, the dots 204 are arranged at equal intervals on a plurality of line segments, for the sake of simplicity. In reality, the point cloud in the environmental map M may have a more complicated arrangement pattern. The environmental map M is not limited to a point cloud map but may be a map including a straight line(s) or a curve(s), or an occupancy grid map. That is, the environmental map M preferably has a structure that enables scan data and the environmental map M to be matched against each other.

Scan data acquired by the external sensor 102 of the vehicle 10 has different point cloud arrangements when the vehicle 10 is at a location PA, a location PB, and a location PC illustrated in FIG. 3. When the time required for the vehicle 10 to move from the location PA to the location PB and then to the location PC is sufficiently longer than a period of time during which the external sensor 102 performs scanning (i.e., when the vehicle 10 moves slowly), two pieces of scan data adjacent to each other on a time axis are highly similar to each other. When the vehicle 10 moves very fast, however, two pieces of scan data adjacent to each other on a time axis may be significantly different from each other.

When the latest scan data and the immediately preceding scan data, which are sequentially output from the external sensor 102, are similar to each other, matching will be relatively easy performed. This means that highly reliable matching is expected to be finished in a short period of time. When the moving velocity of the vehicle 10 is relatively high, however, the latest scan data may not be similar to the immediately preceding scan data. This may increase the time required for matching or may prevent matching from being completed within a predetermined period of time.

Matching

Figure 4:
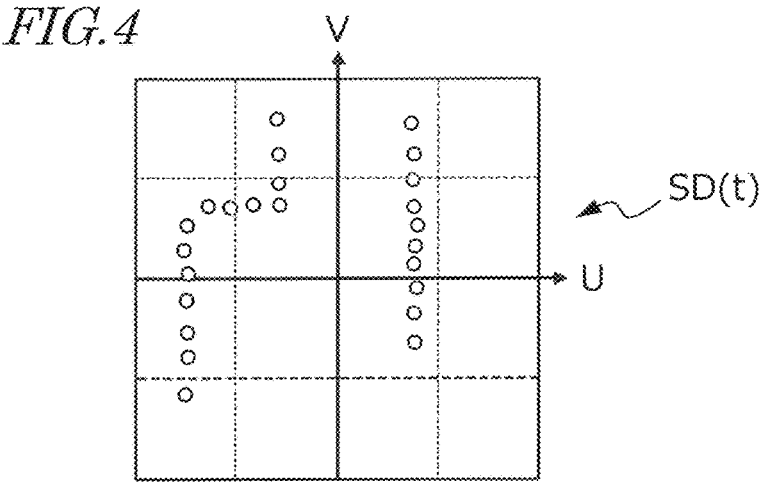
FIG. 4 is a diagram schematically illustrating an example of scan data SD (t) acquired by an external sensor at the time t.

FIG. 4 is a diagram schematically illustrating an example of scan data SD (t) acquired at a time t by the external sensor. The scan data SD (t) is represented by a sensor coordinate system whose location and attitude change together with the vehicle 10. The scan data SD (t) is expressed by a UV coordinate system (see FIG. 9) whose V axis is directly to the front of the external sensor 102 and whose U axis extends in a direction rotated from the V axis by 90 degrees clockwise. The vehicle 10 (or more precisely, the external sensor 102) is located at the origin point of the UV coordinate system. In the present disclosure, the vehicle 10 travels in a direction right in front of the external sensor 102 (i.e., along the V axis) during forward travel of the vehicle 10. For the sake of clarity, points included in the scan data SD (t) are provided in the form of open circles.

Figure 5A:
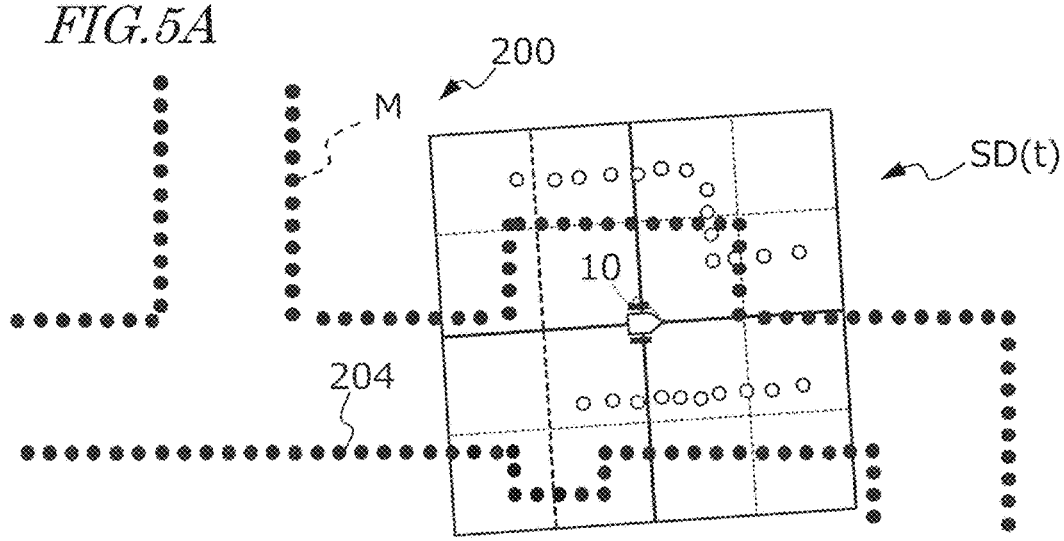
FIG. 5A is a diagram schematically illustrating a state where matching of the scan data SD (t) against the environmental map starts.

FIG. 5A is a diagram schematically illustrating a state where matching of the scan data SD (t) against the environmental map M starts. The location and attitude of the vehicle 10 illustrated in FIG. 5A are given as initial values at the start of matching. When the initial location is close to the actual location and attitude of the vehicle 10, the time required for completion of matching is sufficiently short.

Figure 5B:
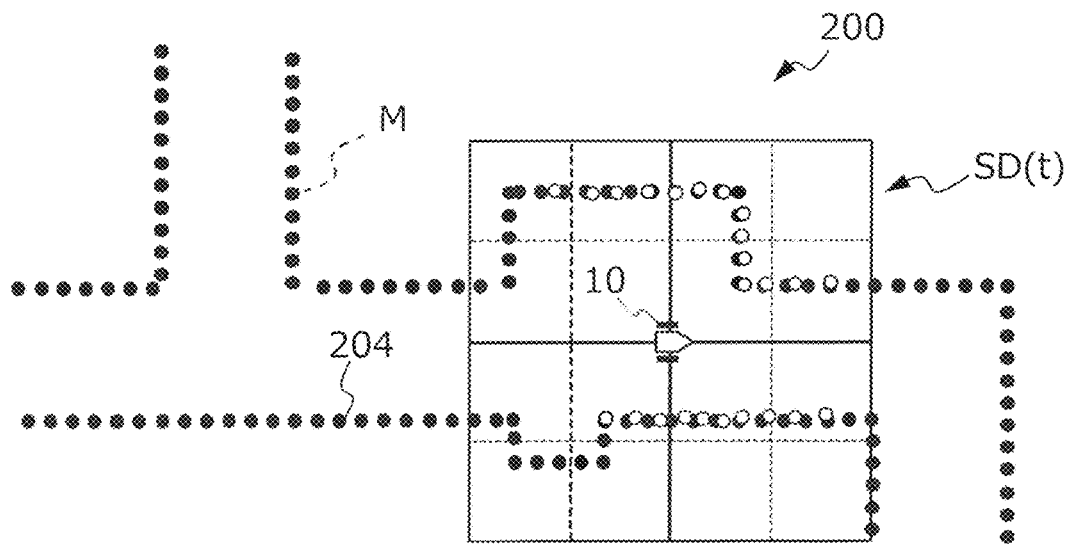
FIG. 5B is a diagram schematically illustrating a state where matching of the scan data SD (t) against the environmental map has been completed.

FIG. 5B is a diagram schematically illustrating a state where matching of the scan data SD (t) against the environmental map M has been completed. In the state where matching has been completed, a relationship is established between the location and attitude of the sensor coordinate system at the time when the external sensor has acquired the scan data SD (t) and the location and attitude of the coordinate system of the environmental map M. This determines estimated values of the location (i.e., the origin point of the sensor coordinate system) and attitude (i.e., the orientation of the sensor coordinate system) of the vehicle 10 at the time t (location identification).

Figure 6A:
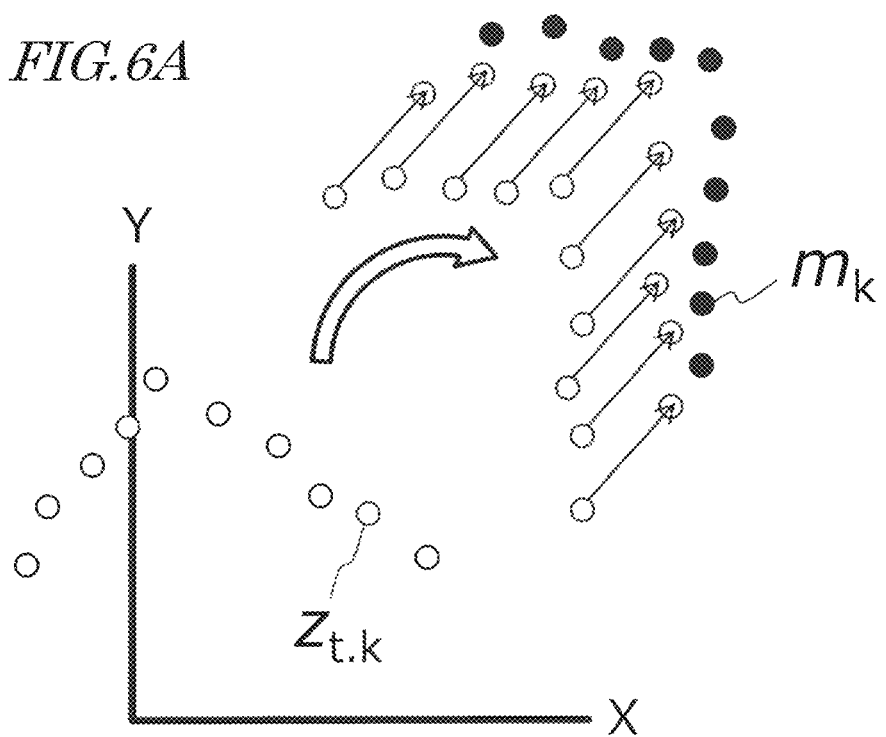
FIG. 6A is a diagram schematically illustrating how a point cloud included in scan data is rotated and translated from an initial location and thus brought close to a point cloud on an environmental map.

FIG. 6A is a diagram schematically illustrating how a point cloud included in scan data is rotated and translated from an initial location and thus brought close to a point cloud on an environmental map. The coordinate value of a k-th point of K points (where k=1, 2, ..., K−1, K) included in the point cloud of the scan data at the time t is represented as $Z_{t,k}$, and the coordinate value of a point on the environmental map corresponding to the k-th point is represented as $m_k$. In this case, errors between the corresponding points in the two point clouds can be evaluated using, as a cost function, $\Sigma(Z_{t,k}-m_k)^2$ that is a square sum of errors calculated for K corresponding points. Rotational and translational rigid transformation is determined so that $\Sigma(Z_{t,k}-m_k)^2$ decreases. Rigid transformation is defined by a transformation matrix (e.g., a homogeneous transformation matrix) including a rotation angle and a translation vector as parameters.

Figure 6B:
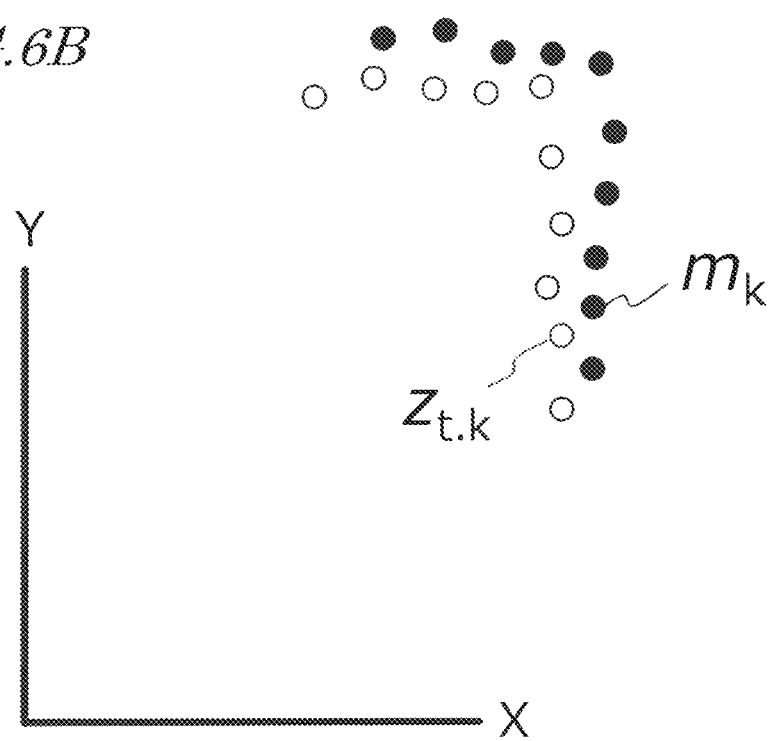
FIG. 6B is a diagram illustrating the location and attitude after rigid transformation of scan data.

FIG. 6B is a diagram illustrating the location and attitude after rigid transformation of the scan data. In the example illustrated in FIG. 6B, the process of matching the scan data against the environmental map has not been completed, so that large errors (or positional gaps) still exist between the two point clouds. To reduce the positional gaps, rigid transformation is further carried out. When the errors thus fall below a predetermined value, matching is completed.

Figure 7:
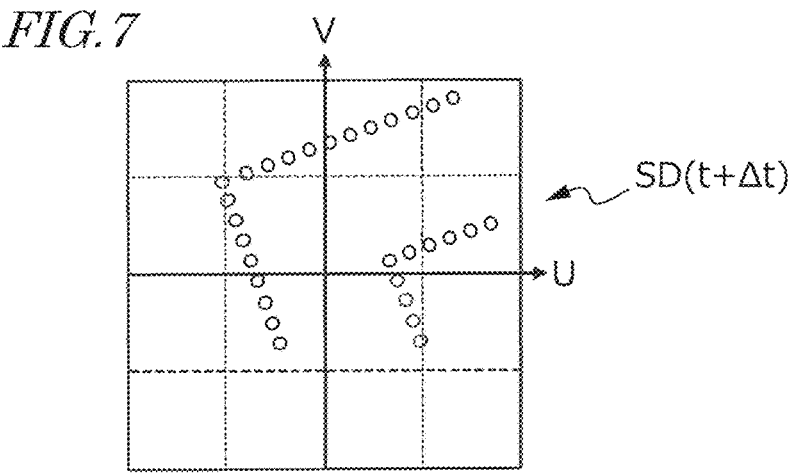
FIG. 7 is a diagram schematically illustrating an example of scan data SD (t+Δt) acquired at a time t+Δt by the external sensor.

FIG. 7 is a diagram schematically illustrating an example of scan data SD (t+Δt) acquired at a time t+Δt by the external sensor. Similarly to FIG. 4, the scan data SD (t+Δt) is represented by a sensor coordinate system whose location and attitude change together with the vehicle 10, and points included in the scan data SD (t+Δt) are provided in the form of open circles. When the location and attitude of the vehicle 10 greatly change during a time Δt, the arrangement of a point cloud of the scan data acquired at the time t+Δt may significantly differ from the arrangement of the point cloud of the scan data acquired at the preceding time t. In this example, the arrangement of the point cloud illustrated in FIG. 7 is significantly different from the arrangement of the point cloud illustrated in FIG. 4. In such a case, starting matching by using the location and attitude of the vehicle 10 at the time t as initial values may result in an excessively large difference between the scan data and the environmental map, which may lead to too much time being required for the matching.

Figure 8A:
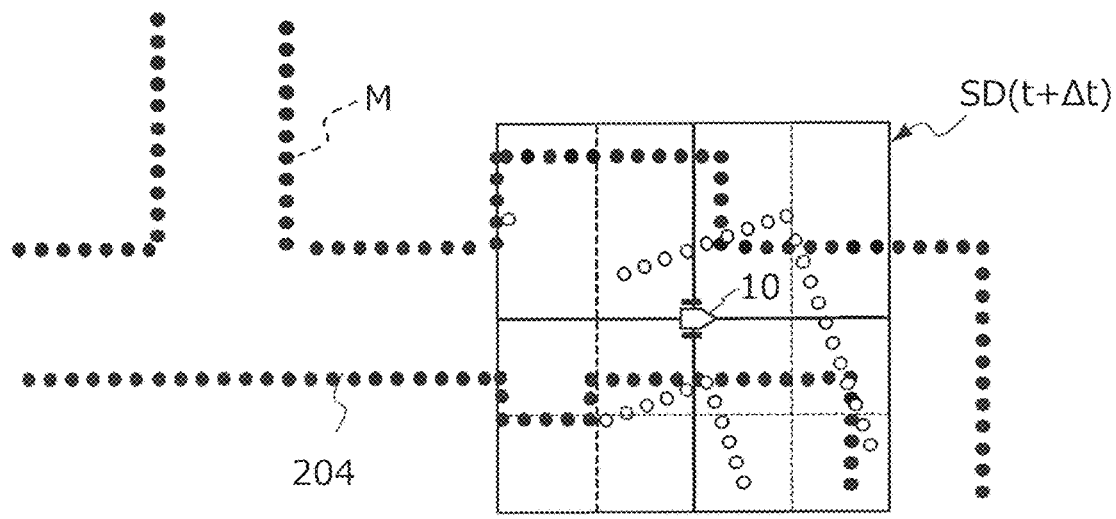
FIG. 8A is a diagram schematically illustrating a state where matching of the scan data SD (t+Δt) against the environmental map starts.

FIG. 8A is a diagram schematically illustrating a state where matching of the scan data SD (t+Δt) against the environmental map M starts.

Figure 8B:
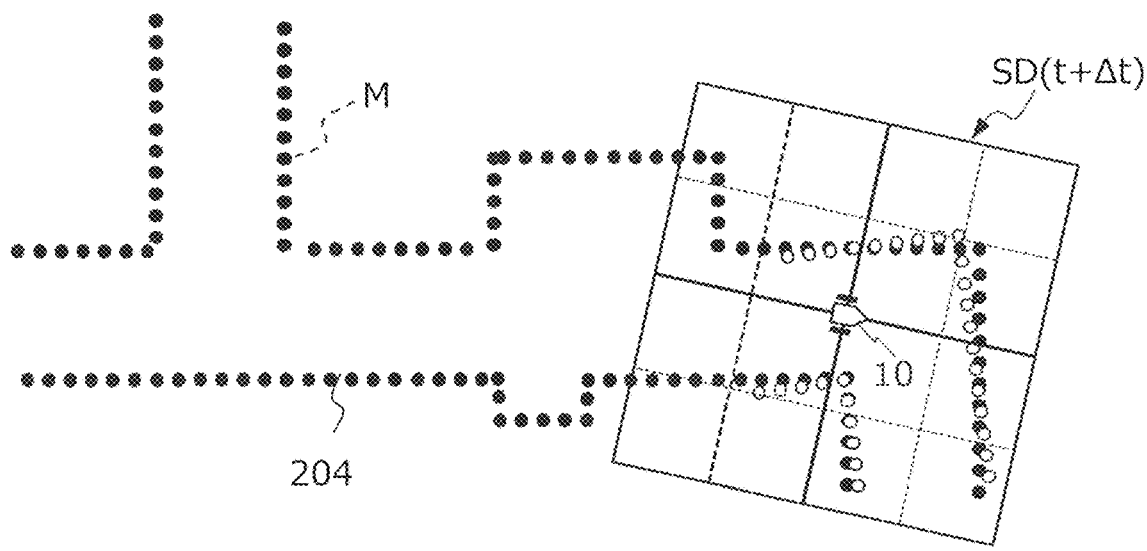
FIG. 8B is a diagram schematically illustrating a state where predicted values calculated in accordance with a history of locations and attitudes are used as initial values of the location and attitude of the vehicle at the time when matching of the scan data SD (t+Δt) against the environmental map starts.

FIG. 8B is, on the other hand, a diagram schematically illustrating a state where predicted values obtained by calculations described below are used as initial values of the location and attitude of the vehicle 10 at the time when matching of the scan data SD (t+Δt) with the environmental map M starts.

As is clear from FIG. 8B, positional gaps between the scan data SD (t+Δt) and the environmental map M when matching starts are smaller than those in FIG. 8A. The time required for matching is thus reduced.

Initial Value Prediction

Figure 9:
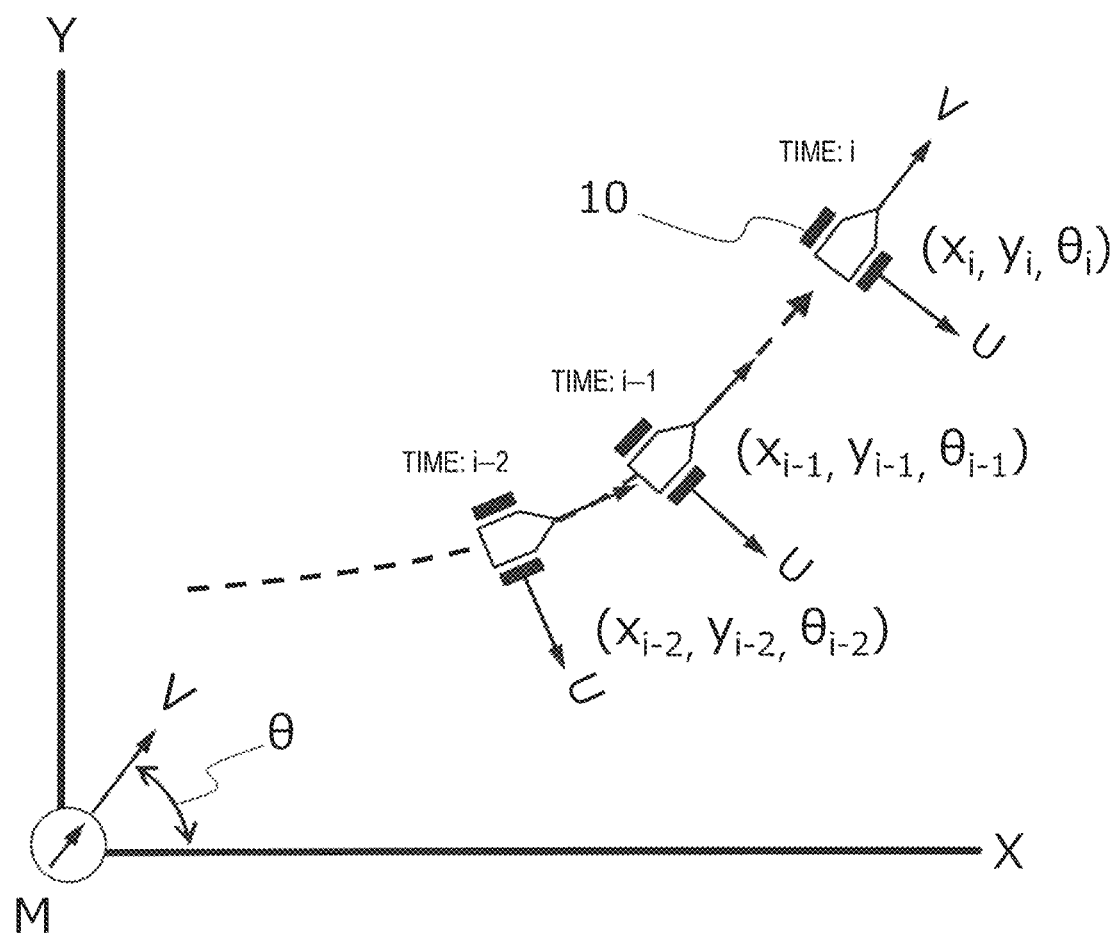
FIG. 9 is a diagram schematically illustrating a history of locations and attitudes of the vehicle obtained in the past by a location estimation device, and predicted values of the current location and attitude.

Referring to FIG. 9, the following description discusses how the location and attitude of the vehicle 10 are predicted. FIG. 9 is a diagram schematically illustrating a history of locations and attitudes of the vehicle 10 obtained in the past by the location estimation device 106 illustrated in FIG. 1, and predicted values of the current location and attitude. The history of locations and attitudes is stored in an internal memory of the location estimation device 10. A portion or the entirety of the history may be stored in a storage device external to the location estimation device 10 (e.g., the storage device 104 illustrated in FIG. 1).

FIG. 9 also illustrates a UV coordinate system that is a local coordinate system (or sensor coordinate system) of the vehicle 10. Scan data is expressed by the UV coordinate system. The location of the vehicle 10 on the environmental map M is indicated by coordinate values (xi, yi) of the origin point of the UV coordinate system for a coordinate system of the environmental map M. The attitude (or orientation) of the vehicle 10 is an orientation (θi) of the UV coordinate system for the coordinate system of the environmental map M. θi is "positive" in a counterclockwise direction.

The example embodiment of the present disclosure involves calculating predicted values of the current location and attitude from a history of estimated locations and estimated attitudes obtained in the past by the location estimation device.

An estimated location and an estimated attitude of the vehicle obtained by the preceding matching are defined as $(x_{i-1}, y_{i-1}, \theta_{i-1})$. An estimated location and an estimated attitude of the vehicle obtained by matching previous to the preceding matching are defined as $(x_{i-2}, y_{i-2}, \theta_{i-2})$. Predicted values of the current location and attitude of the vehicle are defined as $(x_i, y_i, \theta_i)$. Thus, the following assumptions are made.

Assumption 1: The time required for movement from the estimated location $(x_{i-1}, y_{i-1})$ to the current location $(x_i, y_i)$ is equal to the time required for movement from the estimated location $(x_{i-2}, y_{i-2})$ to the estimated location $(x_{i-1}, y_{i-1})$.

Assumption 2: The moving velocity (i.e., the rate of change in the estimated location) during the movement from the estimated location $(x_{i-1}, y_{i-1})$ to the current location $(x_i, y_i)$ is equal to the moving velocity during the movement from the estimated location $(x_{i-2}, y_{i-2})$ to the estimated location $(x_{i-1}, y_{i-1})$.

Assumption 3: A change in the attitude (or orientation) of the vehicle that is represented as $\theta_i - \theta_{i-1}$ is equal to $\Delta\theta$ (where $\Delta\theta = \theta_{i-1} - \theta_{i-2}$).

Based on these assumptions, Eq. 1 below is established.

$$\begin{bmatrix} x_i \\ y_i \end{bmatrix} = \begin{bmatrix} x_{i-1} \\ y_{i-1} \end{bmatrix} + \begin{bmatrix} \cos(\Delta\theta) & -\sin(\Delta\theta) \\ \sin(\Delta\theta) & \cos(\Delta\theta) \end{bmatrix} \begin{bmatrix} x_{i-1} - x_{i-2} \\ y_{i-1} - y_{i-2} \end{bmatrix} \quad [\text{Eq. 1}]$$

As mentioned above, $\Delta\theta$ is equal to $\theta_{i-1} - \theta_{i-2}$.

For the attitude (or orientation) of the vehicle, the relationship represented by Eq. 2 below is established based on Assumption 3.

$$\theta_i = \theta_{i-1} + \Delta\theta \quad [\text{Eq. 2}]$$

Making an approximation such that $\Delta\theta$ is zero may simplify calculation of a matrix on the second term of the right side of Eq. 2 as a unit matrix.

If Assumption 1 is not satisfied, the time required for movement from the location $(x_{i-1}, y_{i-1})$ to the location $(x_i, y_i)$ is defined as $\Delta t$, and the time required for movement from the location $(x_{i-2}, y_{i-2})$ to the location $(x_{i-1}, y_{i-1})$ is defined as $\Delta s$. In this case, $(x_{i-1} - x_{i-2})$ and $(y_{i-1} - y_{i-2})$ on the right side of Eq. 1 may each be corrected by being multiplied by $\Delta t/\Delta s$, and $\Delta\theta$ in the matrix on the right side of Eq. 1 may be corrected by being multiplied by $\Delta t/\Delta s$.

The "history" of locations and attitudes is time-series data on estimated values. The history may include estimated values having relatively low reliability or may include abnormal values greatly deviated from a movement path. Such values may be excluded from the calculation of predicted values.

When the vehicle moves in accordance with an instruction from an operation management device described below, details of the instruction may be used for prediction. Exemplary details of such an instruction include designating whether a movement path is a straight line or a curve and designating a moving velocity.

Using not only a short period of time from the time $t-\Delta s$ to the time t but also a history for a longer period of time enables prediction with higher accuracy and higher precision. One example may involve selecting estimated locations and estimated attitudes of the vehicle that are obtained at three or more different points in time included in the history so as to predict the location and attitude of the vehicle.

The method for predicting the current location and attitude from a history of estimated locations and estimated attitudes of the vehicle does not need to be performed by conducting computations. Such predictions may be made using a pre-trained model prepared by machine learning, such as deep learning.

Operational Flow of Location Estimation Device

Figure 10:
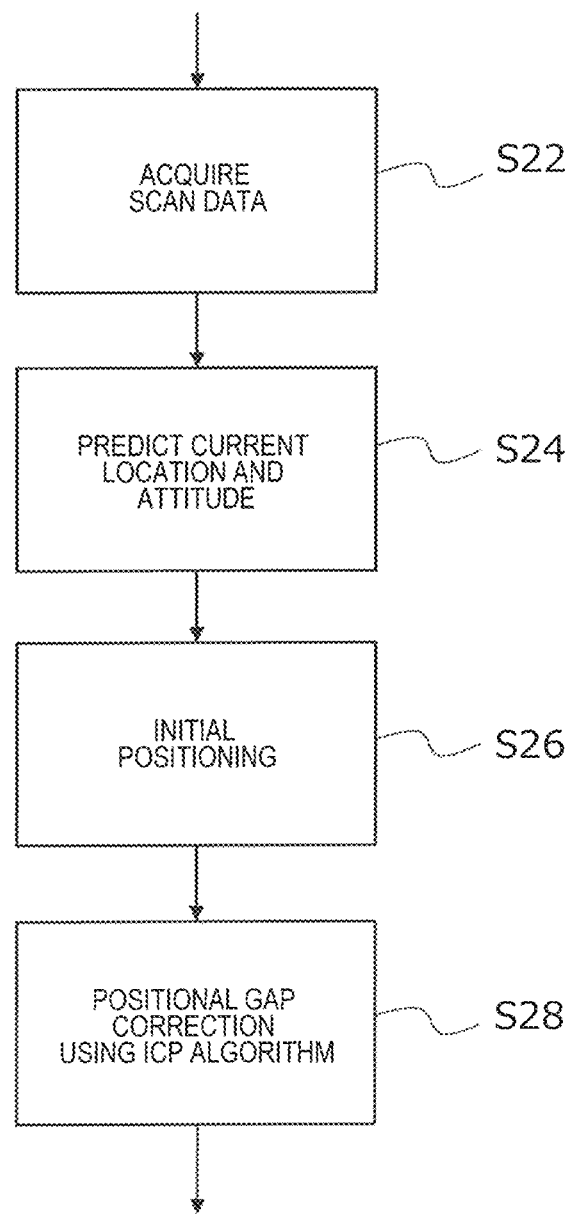
FIG. 10 is a flow chart illustrating a portion of the operation to be performed by a location estimation device according to an example embodiment of the present disclosure.
Figure 11:
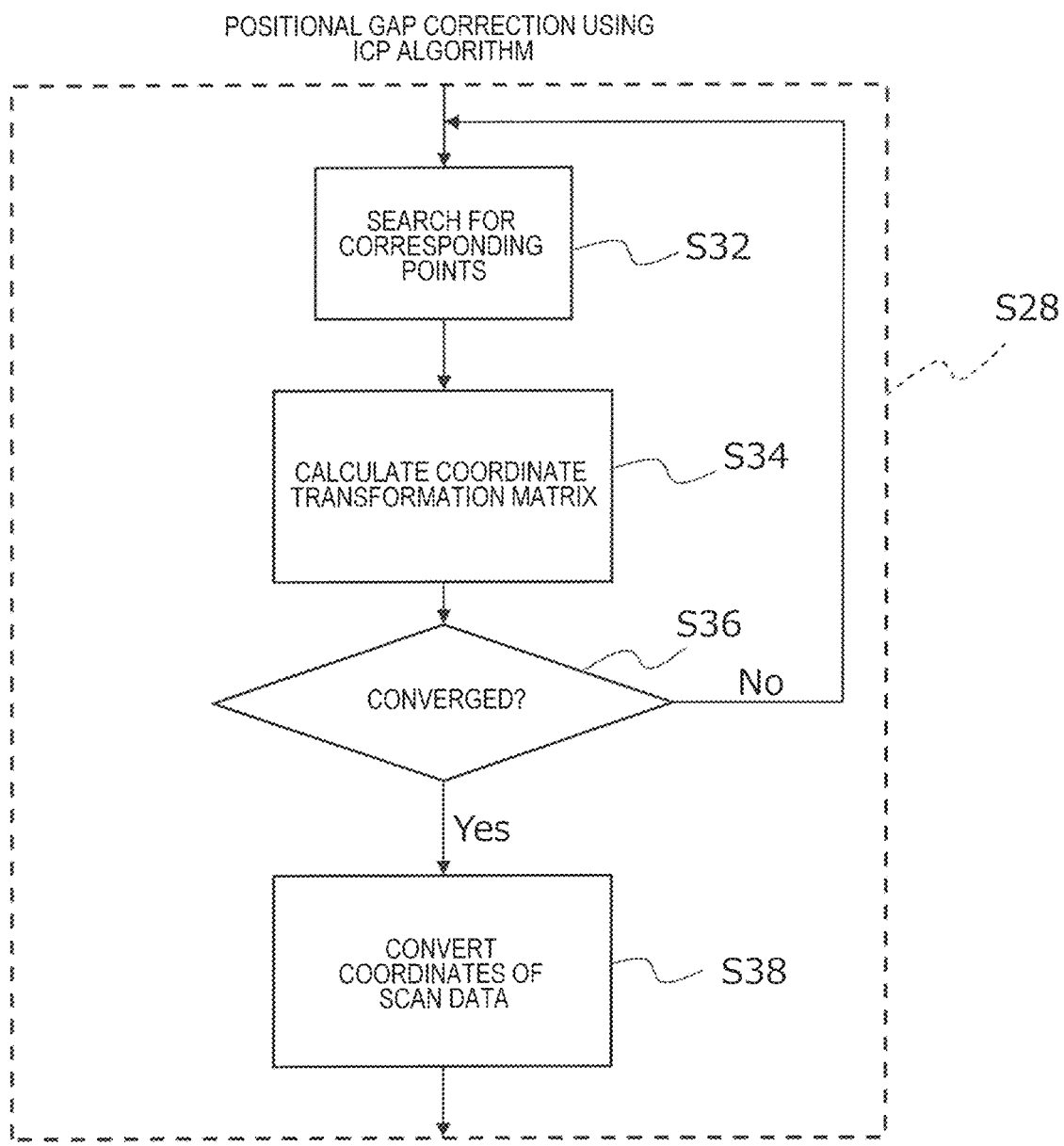
FIG. 11 is a flow chart illustrating a portion of the operation to be performed by the location estimation device according to an example embodiment of the present disclosure.

Referring to FIG. 1, FIG. 10, and FIG. 11, operating steps to be performed by the location estimation device according to an example embodiment of the present disclosure will be described.

Operational Flow of Location Estimation Device

Referring to FIG. 1, FIG. 10, and FIG. 11, operating steps to be performed by the location estimation device according to the example embodiment of the present disclosure will be described.

First, FIG. 10 is referred to.

In step S22, the location estimation device 106 acquires scan data from the external sensor 102.

In step S24, the location estimation device 106 predicts the current location and attitude from a history by the above-described method so as to determine predicted values.

In step S26, the location estimation device 106 performs initial positioning by using the aforementioned predicted values.

In step S28, the location estimation device 106 makes positional gap correction by using an ICP algorithm.

Next, referring to FIG. 11, positional gap correction made in step S28 will be described below.

First, in step S32, a search is made for corresponding points. Specifically, points on the environmental map are selected, each corresponding to an associated one of points of a point cloud included in scan data.

In step S34, rotational and translational rigid transformation (i.e., coordinate transformation) for the scan data is performed so that distances between the corresponding points of the scan data and the environmental map are reduced. This is synonymous to optimizing parameters of a coordinate transformation matrix so that a sum total (or square sum) of the distances between the corresponding points (i.e., the errors between the corresponding points) is reduced. This optimization is performed by iterative calculations.

Step S36 involves determining whether results of the iterative calculations have converged. Specifically, they are determined to have converged when a decrement in the sum total (or square sum) of the errors between the corresponding points remains below a predetermined value even if the parameters of the coordinate transformation matrix are changed. When they have not yet converged, the process returns to step S32 to repeat the process beginning from making a search for corresponding points. When the results of iterative calculations are determined to have converged in step S36, the process goes to step S38.

In step S38, by using the coordinate transformation matrix, coordinate values of the scan data are converted from values of the sensor coordinate system into values of the coordinate system of the environmental map. The coordinate values of the scan data thus obtained are usable to update the environmental map.

If the moving velocity of the vehicle 10 is high and the scan data periodically acquired from the external sensor 102 changes considerably, the vehicle according to the present disclosure would reduce the possibility that the amount of time required for matching may significantly increase or matching may not be completed within a predetermined period of time, thus resulting in a failure in location identification.

The vehicle according to the present disclosure also makes it unnecessary to estimate the location and attitude by using an output from an internal sensor, such as a rotary encoder. A rotary encoder, in particular, produces large errors when a wheel slips, resulting in low reliability of measured values because the errors are accumulated. Measurement by a rotary encoder is not suitable for a vehicle that moves by using an omnidirectional wheel (such as a Mecanum wheel) or a two-legged or multi-legged walking device, or flying vehicles (such as a vercraft and a drone). In contrast, the location estimation device according to the present disclosure is usable for various vehicles that move by using various driving units.

The vehicle according to the present disclosure does not need to include a driving unit. The vehicle may be, for example, a handcart to be thrusted by a user. Such a vehicle may present the location or the location and attitude of the vehicle (which has or have been acquired from the location estimation device) on a map on a display device for the user. The vehicle may notify the user of the location or the location and attitude of the vehicle by sound.

Figure 12:
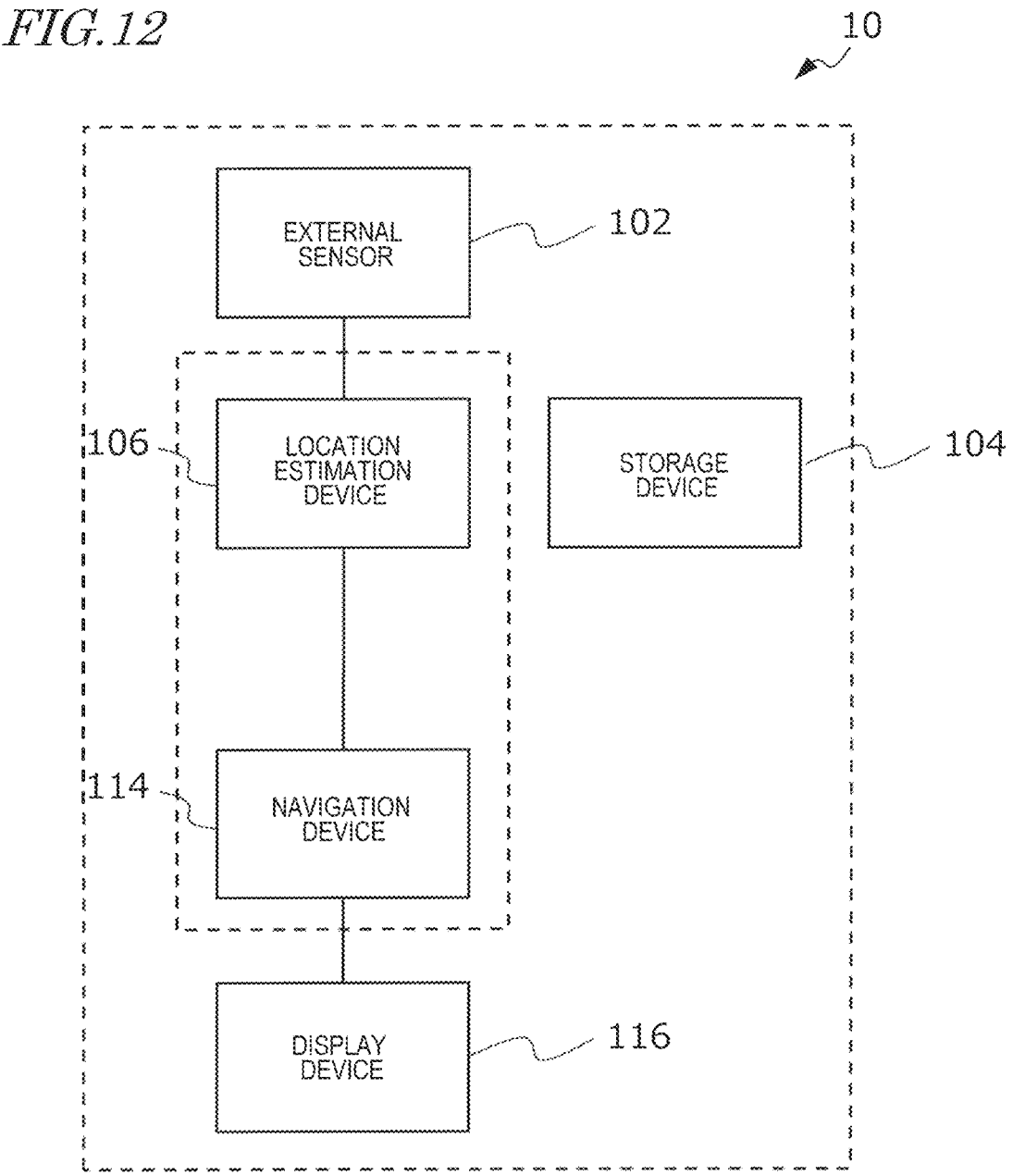
FIG. 12 is a diagram illustrating another example configuration of the vehicle according to an example embodiment of the present disclosure.

FIG. 12 is a diagram illustrating another example configuration of the vehicle 10 according to the present disclosure. The vehicle 10 illustrated in this figure includes a navigation device 114 to guide the user by using information on the location or the location and attitude of the vehicle output from the location estimation device 106. The navigation device 114 is connected to a display device 116 to guide the user with an image(s) or a sound(s). The display device 116 is able to present the current location and target location on a map or emit a sound such as "stop" or "turn right". The user is thus able to move the vehicle 10 to its destination by pushing the vehicle 10. Examples of the vehicle 10 just described include a handcart and other carts.

The vehicle 10 configured as illustrated in FIG. 12 provides a route guide in accordance with the destination or path preliminarily stored in a memory (not shown) in the navigation device 114.

Illustrative Example Embodiment

The example embodiment of the vehicle according to the present disclosure will be described below in more detail. In the present example embodiment, an automated guided vehicle will be used as an example of the vehicle. In the following description, the automated guided vehicle will be abbreviated as "AGV". The "AGV" will hereinafter be identified by the reference sign "10" similarly to the vehicle 10.

(1) Basic Configuration of System

Figure 13:
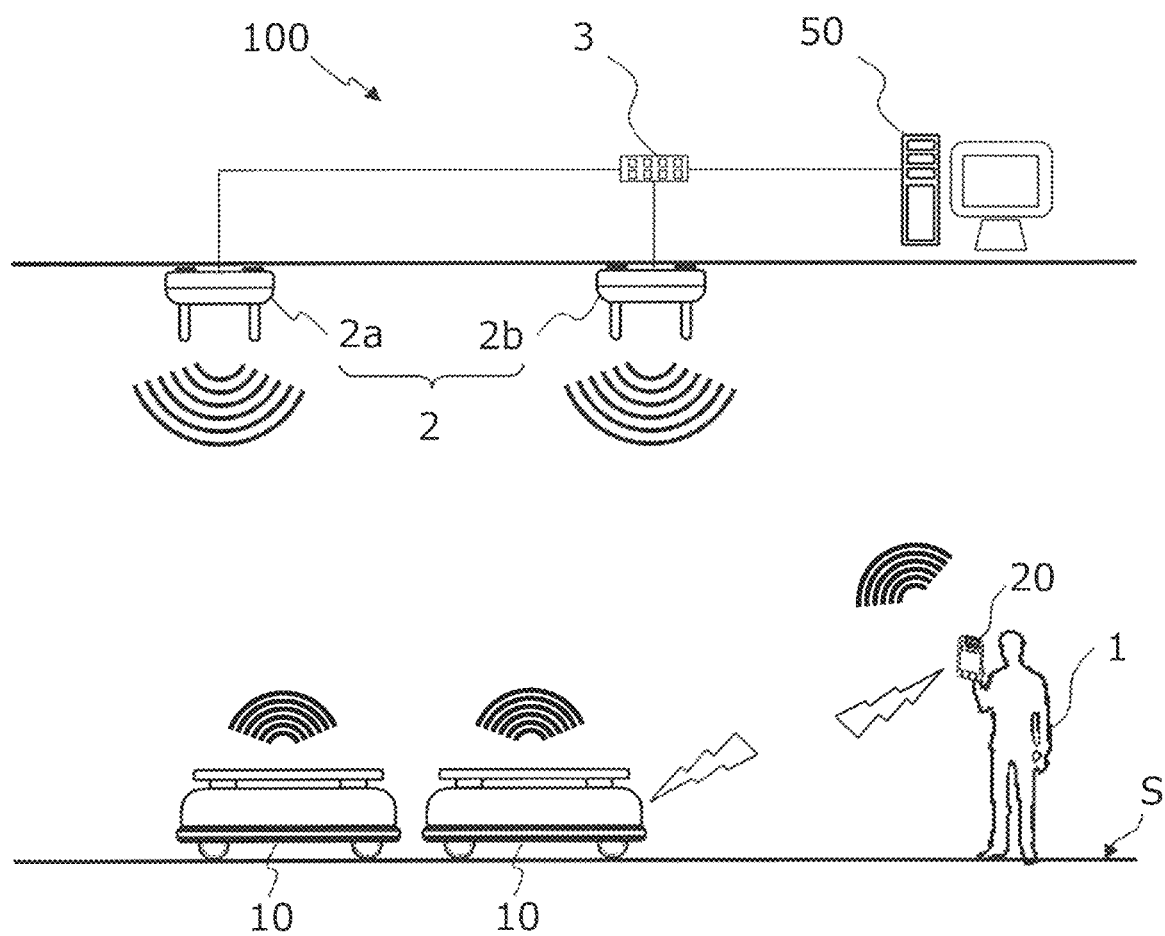
FIG. 13 is a diagram schematically illustrating a control system according to an example embodiment of the present disclosure that controls travel of each AGV.

FIG. 13 illustrates an example basic configuration of an illustrative vehicle management system 100 according to the present disclosure. The vehicle management system 100 includes at least one AGV 10 and an operation management device 50 to manage operations of the AGV 10. FIG. 13 also illustrates a terminal device 20 to be operated by a user 1.

The vehicle 10 is an automated guided car that is able to travel in a "guideless mode" that requires no guiding object, such as a magnetic tape, for travel. The AGV 10 is able to perform localization and transmit estimation results to the terminal device 20 and the operation management device 50. The AGV 10 is able to perform automated travel in an environment S in accordance with a command from the operation management device 50.

The operation management device 50 is a computer system that tracks the location of each AGV 10 and manages the travel of each AGV 10. The operation management device 50 may be a desktop PC, a notebook PC, and/or a server computer. The operation management device 50 communicates with each AGV 10 through a plurality of access points 2. For example, the operation management device 50 transmits, to each AGV 10, data on the coordinates of the next destination for each AGV 10. Each AGV 10 transmits, to the operation management device 50, data indicative of the location and attitude (or orientation) of each AGV 10 at regular time intervals (e.g., for every 250 milliseconds). When the AGV 10 has reached the designated location, the operation management device 50 transmits data on the coordinates of the next destination to the AGV 10. Each AGV 10 may be able to travel in the environment S in accordance with an operation input to the terminal device 20 by the user 1. An example of the terminal device 20 is a tablet computer.

Figure 14:
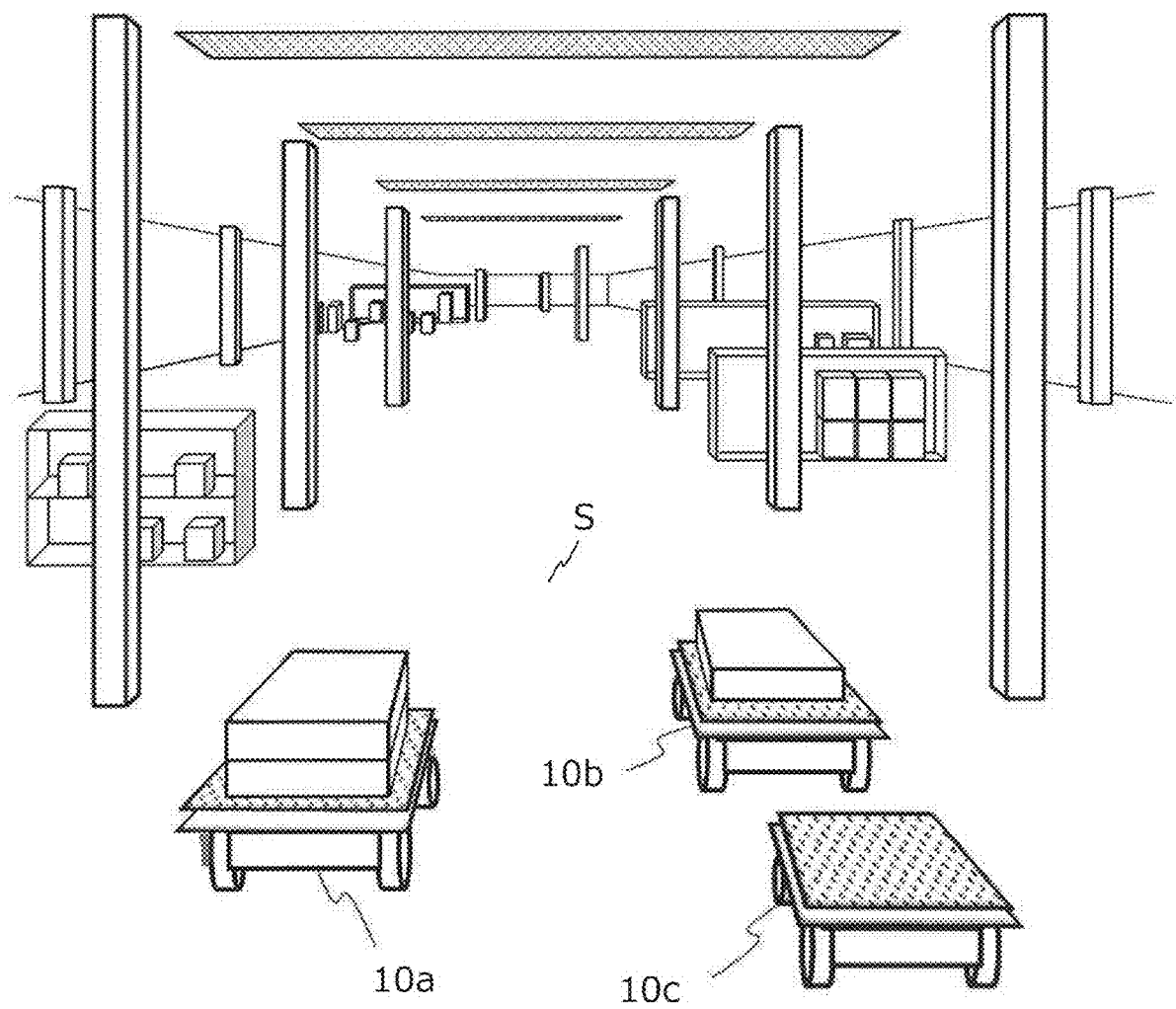
FIG. 14 is a perspective view illustrating an example of an environment in which AGVs are present.

FIG. 14 illustrates an example of the environment S where three AGVs 10a, 10b, and 10c are present. Each of the AGVs is traveling in a depth direction in the figure. The AGVs 10a and 10b are conveying cargo placed on their tops. The AGV 10c is following the AGV 10b traveling ahead of the AGV 10c. Although the AGVs are identified by the reference signs "10a", "10b", and "10c" in FIG. 14 for the sake of convenience of description, they will hereinafter be described as the "AGV 10".

Figure 15:
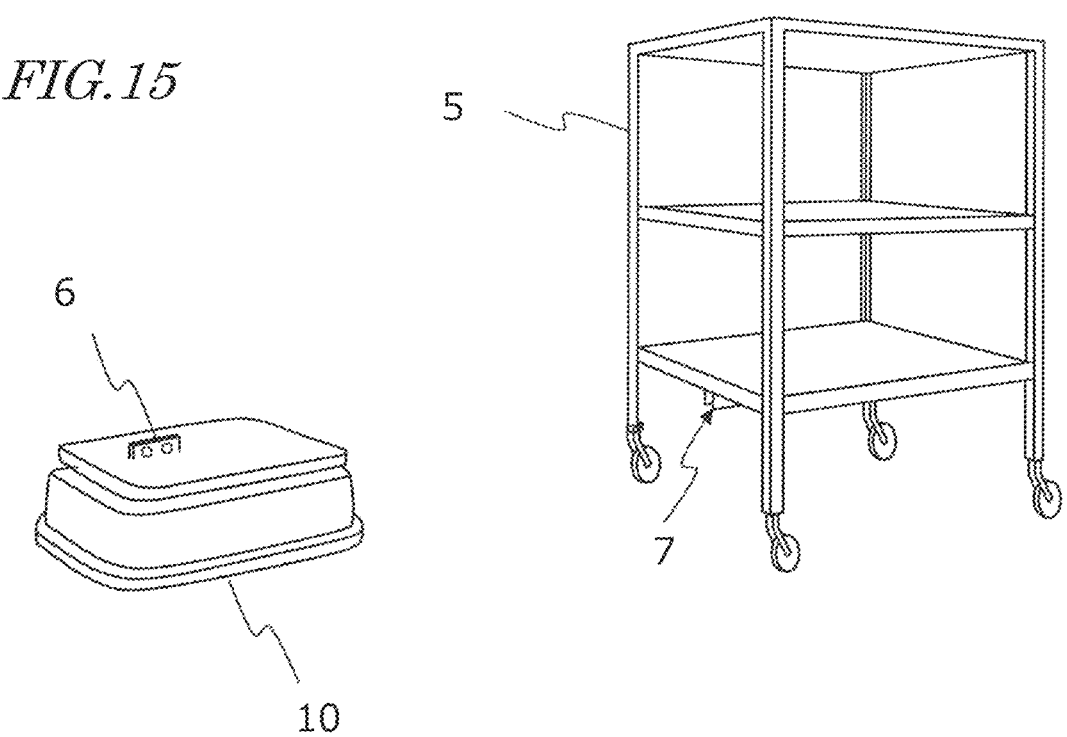
FIG. 15 is a perspective view illustrating an AGV and a trailer unit before being coupled to each other.
Figure 16:
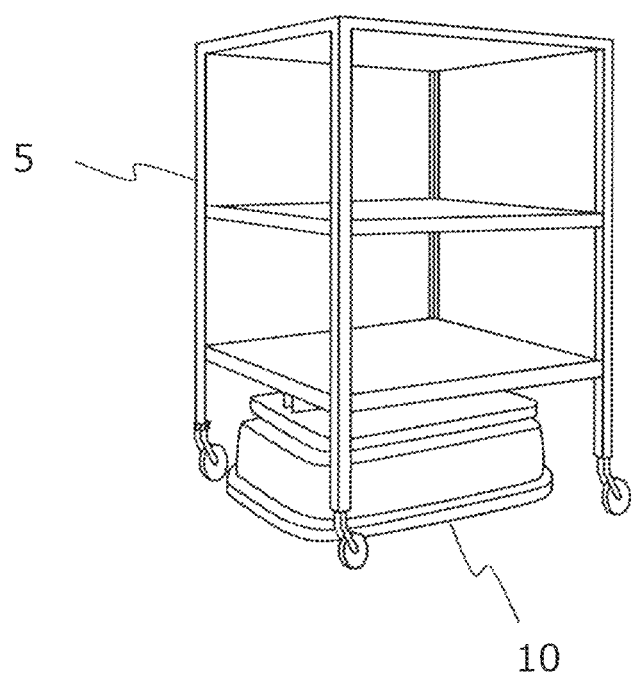
FIG. 16 is a perspective view illustrating the AGV and the trailer unit coupled to each other.

The AGV 10 is able to not only convey cargo placed on its top but also convey cargo by using a trailer unit connected to the AGV 10. FIG. 15 illustrates the AGV 10 and a trailer unit 5 before being coupled to each other. Each leg of the trailer unit 5 is provided with a caster. The AGV 10 is mechanically coupled to the trailer unit 5. FIG. 16 illustrates the AGV 10 and the trailer unit 5 coupled to each other. When the AGV 10 travels, the trailer unit 5 is towed by the AGV 10. The AGV 10 is able to convey the cargo placed on the trailer unit 5 by towing the trailer unit 5.

The AGV 10 may be coupled to the trailer unit 5 by any method. An example of the coupling method will be described below. A plate 6 is secured to the top of the AGV 10. The trailer unit 5 is provided with a guide 7 including a slit. The AGV 10 approaches the trailer unit 5 so that the plate 6 is inserted into the slit of the guide 7. Upon completion of the insertion, the AGV 10 has an electromagnetic lock pin (not shown) passed through the plate 6 and the guide 7 and activates an electromagnetic lock. The AGV 10 and the trailer unit 5 are thus physically coupled to each other.

Refer again to FIG. 13. Each AGV 10 and the terminal device 20 are connected to each other, for example, on a one-to-one basis so that each AGV 10 and the terminal device 20 are able to mutually communicate in compliance with Bluetooth (registered trademark) standards. Each AGV 10 and the terminal device 20 may mutually communicate in compliance with Wi-Fi (registered trademark) standards by using one or more of the access points 2. The access points 2 are mutually connected through, for example, a switching hub 3. In FIG. 13, two access points 2a and 2b are illustrated. Each AGV 10 is wirelessly connected to the access point 2a. The terminal device 20 is wirelessly connected to the access point 2b. Data transmitted from each AGV 10 is received by the access point 2a, transferred to the access point 2b through the switching hub 3, and then transmitted from the access point 2b to the terminal device 20. Data transmitted from the terminal device 20 is received by the access point 2b, transferred to the access point 2a through the switching hub 3, and then transmitted from the access point 2a to each AGV 10. This enables two-way communication between each AGV 10 and the terminal device 20. The access points 2 are also connected to the operation management device 50 through the switching hub 3. This enables two-way communication between the operation management device 50 and each AGV 10.

(2) Creation of Environmental Map

A map of the environment S is generated so that each AGV 10 is able to travel while estimating its own location. Each AGV 10 is equipped with a location estimation device and an LRF and is thus able to generate a map by using an output from the LRF.

Each AGV 10 shifts to a data acquisition mode in response to an operation performed by a user. In the data acquisition mode, each AGV 10 starts acquiring sensor data by using the LRF.

The location estimation device accumulates the sensor data in its storage device. Upon completion of acquisition of the sensor data in the environment S, the sensor data accumulated in the storage device is transmitted to an external device. The external device is a computer which includes, for example, a signal processor and on which a map generation computer program is installed.

The signal processor of the external device superimposes pieces of the sensor data, acquired for each round of scanning, on top of each other. The signal processor repeatedly performs the superimposing process, making it possible to generate a map of the environment S. The external device transmits data on the generated map to each AGV 10. Each AGV 10 stores the data on the generated map in an internal storage device. The external device may be the operation management device 50 or any other device.

Instead of the external device, each AGV 10 may generate a map. The process performed by the signal processor of the external device described above may be performed by a circuit, such as a microcontroller unit (or microcontroller) of each AGV 10. When a map is generated in each AGV 10, the accumulated sensor data does not need to be transmitted to the external device. The data volume of the sensor data is generally believed to be large. Because the sensor data does not need to be transmitted to the external device, a communication line will not be occupied.

Movement within the environment S for acquisition of sensor data may be enabled by travel of each AGV 10 in accordance with an operation performed by the user. For example, each AGV 10 wirelessly receives, from the user through the terminal device 20, a travel command that instructs each AGV 10 to move in each of the front/rear/right/left directions. Each AGV 10 travels in the front/rear/right/left directions in the environment S in accordance with the travel command so as to generate a map. When each AGV 10 is connected by wire to an operating device, such as a joystick, each AGV 10 may travel in the front/rear/right/left directions in the environment S in accordance with a control signal from the operating device so as to generate a map. A person may walk while pushing a measuring car equipped with an LRF, thus acquiring sensor data.

Although FIGS. 13 and 14 illustrate a plurality of the AGVs 10, there may only be one AGV. When a plurality of the AGVs 10 are present, the user 1 may select, by using the terminal device 20, one of the registered AGVs 10 to generate a map of the environment S.

Upon generation of the map, each AGV 10 is able to, from then on, perform automated travel while estimating its own location using the map.

(3) Configuration of AGV

Figure 17:
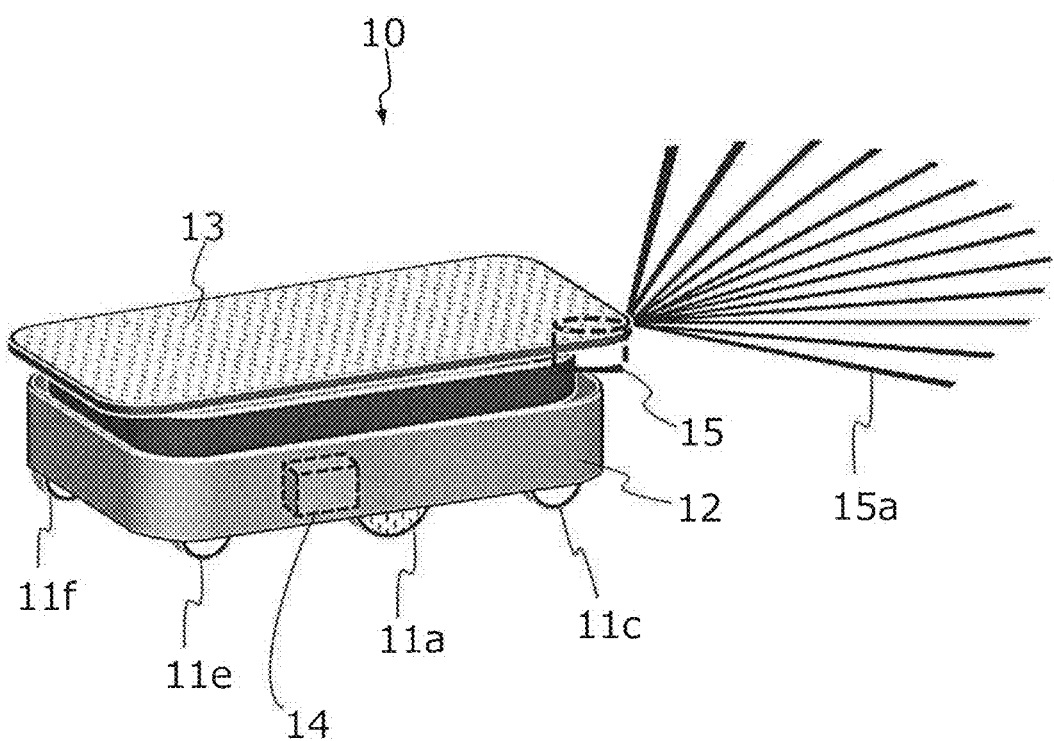
FIG. 17 is an external view of an illustrative AGV according to an example embodiment of the present disclosure.

FIG. 17 is an external view of an illustrative AGV 10 according to the present example embodiment. The AGV 10 includes two driving wheels 11*a* and 11*b*, four casters 11*c*, 11*d*, 11*e*, and 11*f*, a frame 12, a carriage table 13, a travel control unit 14, and an LRF 15. The two driving wheels 11*a* and 11*b* are each provided on an associated one of the right and left portions of the AGV 10. The four casters 11*c*, 11*d*, 11*e*, and 11*f* are each disposed on an associated one of the four corners of the AGV 10. Although the AGV 10 further includes a plurality of motors connected to the two driving wheels 11*a* and 11*b*, the motors are not shown in FIG. 17. FIG. 17 illustrates the single driving wheel 11*a* and the two casters 11*c* and 11*e* located on the right portion of the AGV 10, and the caster 11*f* located on the left rear portion of the AGV 10. The left driving wheel 11*b* and the left front caster 11*d* are obscured behind the frame 12 and are thus not visible. The four casters 11*c*, 11*d*, 11*e*, and 11*f* are able to turn freely. In the following description, the driving wheel 11*a* and the driving wheel 11*b* may respectively be referred to as a "wheel 11*a*" and a "wheel 11*b*".

The travel control unit 14 is a unit to control the operation of the AGV 10. The travel control unit 14 includes an integrated circuit whose main component is a microcontroller (which will be described below), an electronic component(s), and a substrate on which the integrated circuit and the electronic component(s) are mounted. The travel control unit 14 receives and transmits data from and to the terminal device 20 described above and performs preprocessing computations.

The LRF 15 is an optical instrument that emits, for example, infrared laser beams 15*a* and detects reflected light of each laser beam 15*a*, thus measuring a distance to a point of reflection. In the present example embodiment, the LRF 15 of the AGV 10 emits the laser beams 15*a* in a pulsed form to, for example, a space in the range of 135 degrees to the right and to the left (for a total of 270 degrees) with respect to the front surface of the AGV 10 while changing the direction of each laser beam 15*a* by every 0.25 degrees, and detects reflected light of each laser beam 15*a*. This makes it possible to obtain, for every 0.25 degrees, data on a distance to a point of reflection in a direction determined by an angle corresponding to a total of 1081 steps. In the present example embodiment, the LRF 15 scans its surrounding space in a direction substantially parallel to a floor surface, which means that the LRF 15 performs planar (or two-dimensional) scanning. The LRF 15, however, may perform scanning in a height direction.

The AGV 10 is able to generate a map of the environment S in accordance with the location and attitude (or orientation) of the AGV 10 and scanning results obtained by the LRF 15. The map may be reflective of the location(s) of a structure(s), such as a wall(s) and/or a pillar(s) around the AGV, and/or an object(s) placed on a floor. Data on the map is stored in a storage device provided in the AGV 10.

The location and attitude, i.e., the pose (x, y, θ), of the AGV 10 may hereinafter be simply referred to as a "location".

The travel control unit 14 compares measurement results obtained by the LRF 15 with map data retained in itself so as to estimate its own current location in the manner described above. The map data may be map data generated by the other AGV(s) 10.

Figure 18A:
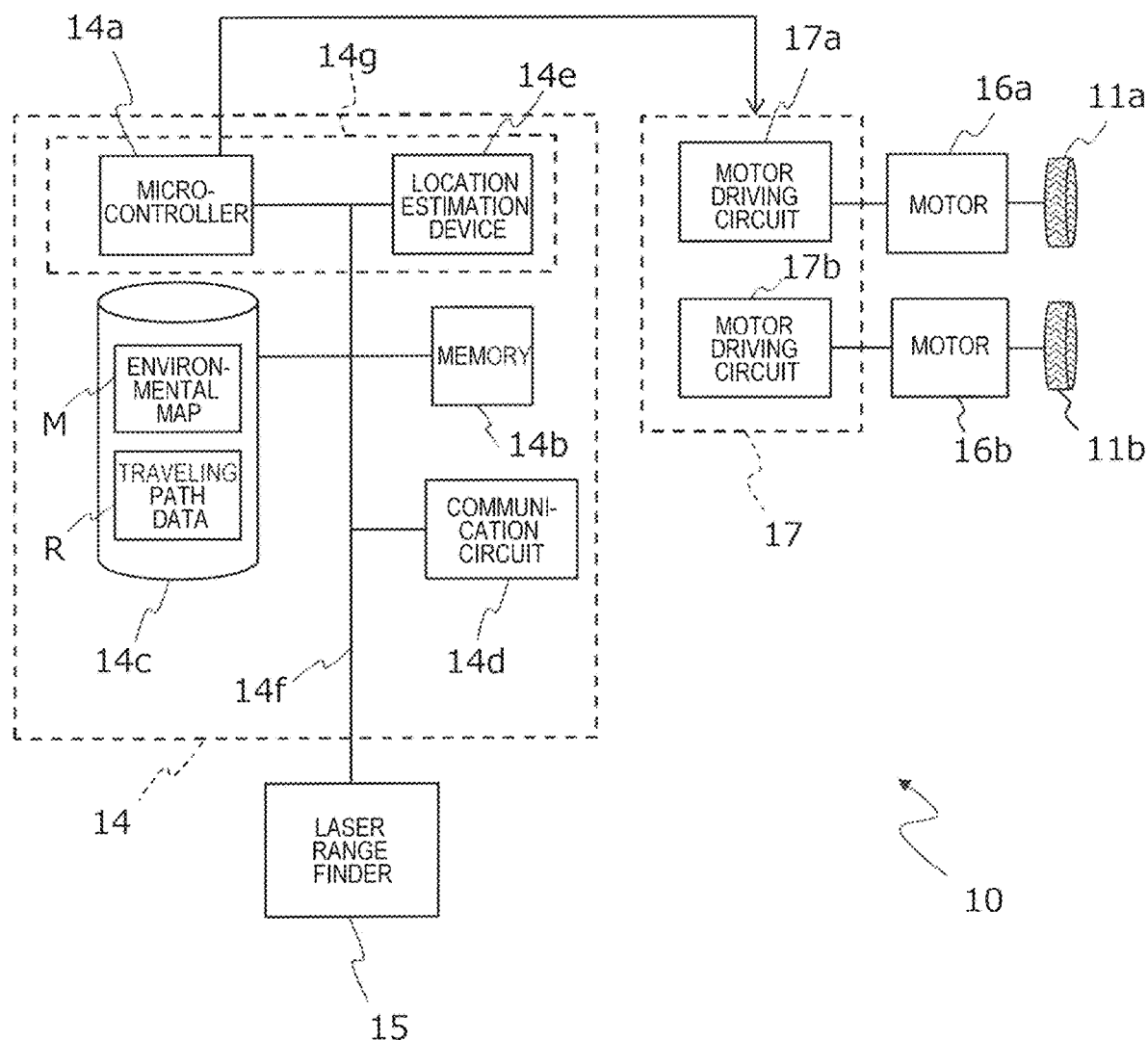
FIG. 18A is a diagram illustrating a first example hardware configuration of the AGV.

FIG. 18A illustrates a first example hardware configuration of the AGV 10. FIG. 18A also illustrates in detail a configuration of the travel control unit 14.

The AGV 10 includes the travel control unit 14, the LRF 15, two motors 16*a* and 16*b*, a driving unit 17, and the wheels 11*a* and 11*b*.

The travel control unit 14 includes a microcontroller 14*a*, a memory 14*b*, a storage device 14*c*, a communication circuit 14*d*, and a location estimation device 14*e*. The microcontroller 14*a*, the memory 14*b*, the storage device 14*c*, the communication circuit 14*d*, and the location estimation device 14*e* are connected to each other through a communication bus 14*f* and are thus able to exchange data with each other. The LRF 15 is also connected to the communication bus 14*f* through a communication interface (not shown) and thus transmits measurement data (which is measurement results) to the microcontroller 14*a*, the location estimation device 14*e*, and/or the memory 14*b*.

The microcontroller 14*a* is a processor or a control circuit (e.g., a computer) that performs computations to control the entire AGV 10 including the travel control unit 14. The microcontroller 14*a* is typically a semiconductor integrated circuit. The microcontroller 14*a* transmits a pulse width modulation (PWM) signal (which is a control signal) to the driving unit 17 and thus controls the driving unit 17 so as to adjust voltages to be applied to the motors. This rotates each of the motors 16*a* and 16*b* at a desired rotation speed.

One or more control circuits (e.g., one or more microcontrollers) to control driving of the left motor 16*a* and the right motor 16b may be provided independently of the microcontroller 14a. For example, the driving unit 17 may include two microcontrollers each of which controls driving of an associated one of the motors 16a and 16b.

The memory 14b is a volatile storage device to store a computer program to be executed by the microcontroller 14a. The memory 14b may also be used as a working memory when the microcontroller 14a and the location estimation device 14e perform computations.

The storage device 14c is a non-volatile semiconductor memory device. Alternatively, the storage device 14c may be a magnetic storage medium, such as a hard disk, or an optical storage medium, such as an optical disc. The storage device 14c may include a head device to write and/or read data to and/or from any of the storage media, and a controller for the head device.

The storage device 14c stores: environmental map M on the environment S in which the AGV 10 travels; and data on one or a plurality of traveling paths (i.e., traveling path data R). The environmental map M is generated by operating the AGV 10 in a map generating mode and stored in the storage device 14c. The traveling path data R is transmitted from outside after the environmental map M is generated. In the present example embodiment, the environmental map M and the traveling path data R are stored in the same storage device 14c. Alternatively, the environmental map M and the traveling path data R may be stored in different storage devices.

An example of the traveling path data R will be described below.

When the terminal device 20 is a tablet computer, the AGV 10 receives, from the tablet computer, the traveling path data R indicative of a traveling path(s). The traveling path data R in this case includes marker data indicative of the locations of a plurality of markers. The "markers" indicate locations (or passing points) to be passed by the traveling AGV 10. The traveling path data R includes at least location information on a start marker indicative of a travel start location and an end marker indicative of a travel end location. The traveling path data R may further include location information on a marker(s) indicative of one or more intermediate passing points. Supposing that a traveling path includes one or more intermediate passing points, a path extending from the start marker and sequentially passing through the travel passing points so as to reach the end marker is defined as a "traveling path". Data on each marker may include, in addition to coordinate data on the marker, data on the orientation (or angle) and traveling velocity of the AGV 10 until the AGV 10 moves to the next marker. When the AGV 10 temporarily stops at the location of each marker, performs localization, and provides, for example, notification to the terminal device 20, the data on each marker may include data on acceleration time required for acceleration to reach the traveling velocity, and/or deceleration time required for deceleration from the traveling velocity so as to stop at the location of the next marker.

Instead of the terminal device 20, the operation management device 50 (e.g., a PC and/or a server computer) may control movement of the AGV 10. In this case, each time the AGV 10 reaches a marker, the operation management device 50 may instruct the AGV 10 to move to the next marker. From the operation management device 50, for example, the AGV 10 receives, in the form of the traveling path data R of a traveling path(s), coordinate data of a target location (which is the next destination) or data on a distance to the target location and an angle at which the AGV 10 should travel.

The AGV 10 is able to travel along the stored traveling path(s) while estimating its own location using the generated map and the sensor data acquired during travel and output from the LRF 15.

The communication circuit 14d is, for example, a wireless communication circuit to perform wireless communication compliant with Bluetooth (registered trademark) standards and/or Wi-Fi (registered trademark) standards. The Bluetooth standards and Wi-Fi standards both include a wireless communication standard that uses a frequency band of 2.4 GHz. For example, in a mode of generating a map by running the AGV 10, the communication circuit 14d performs wireless communication compliant with Bluetooth (registered trademark) standards so as to communicate with the terminal device 20 on a one-to-one basis.

The location estimation device 14e performs the process of generating a map and the process of estimating, during travel, its own location. The location estimation device 14e generates a map of the environment S in accordance with the location and attitude of the AGV 10 and scanning results obtained by the LRF. During travel, the location estimation device 14e receives sensor data from the LRF 15 and reads the environmental map M stored in the storage device 14c. Local map data (or sensor data) generated from the scanning results obtained by the LRF 15 is matched against the environmental map M covering a larger range, thus identifying its own location (x, y, θ) on the environmental map M. The location estimation device 14e generates data on "reliability" indicative of the degree of agreement between the local map data and the environmental map M. The respective data of its own location (x, y, θ) and reliability may be transmitted from the AGV 10 to the terminal device 20 or the operation management device 50. The terminal device 20 or the operation management device 50 is able to receive the respective data of its own location (x, y, θ) and reliability and present the location (x, y, θ) and the data on a display device built into the terminal device 20 or the operation management device 50 or connected thereto.

In the present example embodiment, the microcontroller 14a and the location estimation device 14e are separate components by way of example. Alternatively, a single chip circuit or semiconductor integrated circuit that enables the microcontroller 14a and the location estimation device 14e to operate independently may be provided. FIG. 18A illustrates a chip circuit 14g that includes the microcontroller 14a and the location estimation device 14e. The following description discusses an example where the microcontroller 14a and the location estimation device 14e are provided separately and independently.

The two motors 16a and 16b are each attached to an associated one of the two wheels 11a and 11b so that each wheel is rotated. In other words, each of the two wheels 11a and 11b is a driving wheel. Each of the motors 16a and 16b is described herein as a motor to drive an associated one of the right and left wheels of the AGV 10.

The driving unit 17 includes motor driving circuits 17a and 17b to adjust voltages to be applied to the two motors 16a and 16b. The motor driving circuits 17a and 17b each include an "inverter circuit". The motor driving circuits 17a and 17b each turn on and off a current flowing through an associated one of the motors by a PWM signal transmitted from the microcontroller 14a or a microcontroller in the motor driving circuit 17a, thus adjusting a voltage to be applied to an associated one of the motors.

Figure 18B:
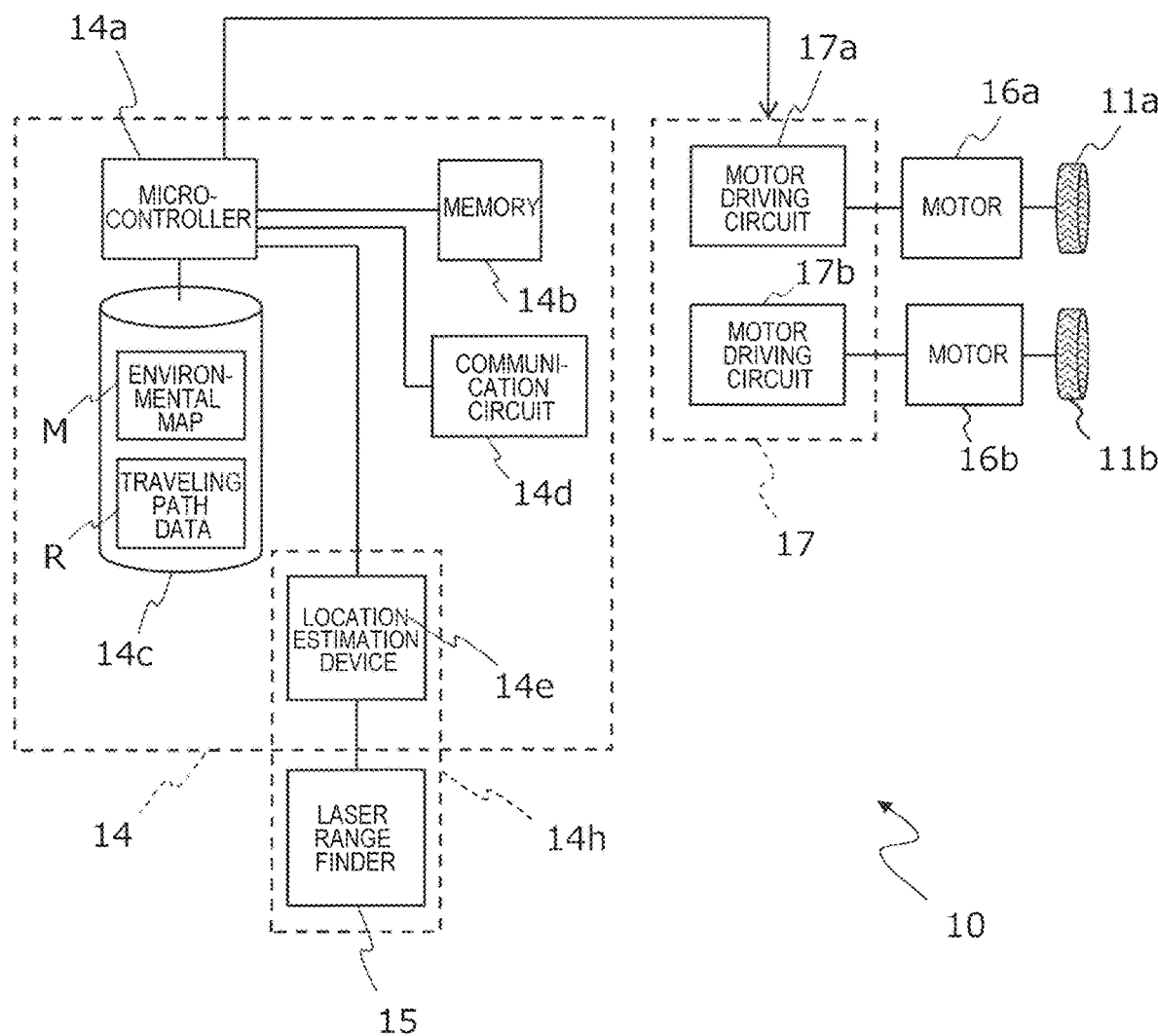
FIG. 18B is a diagram illustrating a second example hardware configuration of the AGV.

FIG. 18B illustrates a second example hardware configuration of the AGV 10. The second example hardware configuration differs from the first example hardware configuration (FIG. 18A) in that a laser positioning system 14h is provided and the microcontroller 14a is connected to each component on a one-to-one basis.

The laser positioning system 14h includes the location estimation device 14e and the LRF 15. The location estimation device 14e and the LRF 15 are connected through, for example, an Ethernet (registered trademark) cable. The location estimation device 14e and the LRF 15 each operate as described above. The laser positioning system 14h outputs information indicative of the pose (x, y, θ) of the AGV 10 to the microcontroller 14a.

The microcontroller 14a includes various general-purpose I/O interfaces or general-purpose input and output ports (not shown). The microcontroller 14a is directly connected through the general-purpose input and output ports to other components in the travel control unit 14, such as the communication circuit 14d and the laser positioning system 14h.

The configuration of FIG. 18B is similar to the configuration of FIG. 18A except the features described above with reference to FIG. 18B. Description of the similar features will thus be omitted.

The AGV 10 according to an example embodiment of the present disclosure may include safety sensors, such as an obstacle detecting sensor and a bumper switch (not shown).

(4) Configuration Example of Operation Management Device

Figure 19:
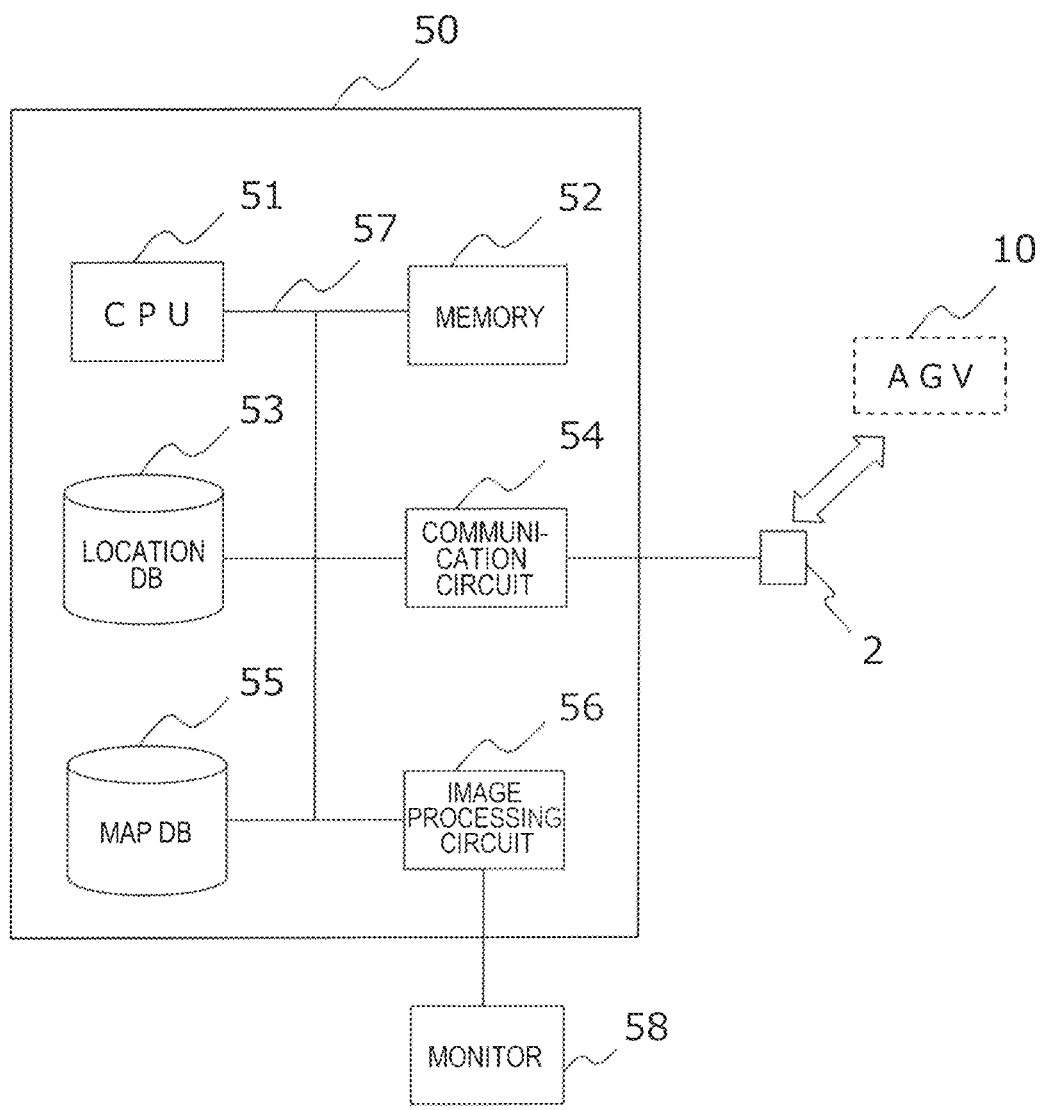
FIG. 19 is a diagram illustrating an example hardware configuration of an operation management device.

FIG. 19 illustrates an example hardware configuration of the operation management device 50. The operation management device 50 includes a CPU 51, a memory 52, a location database (location DB) 53, a communication circuit 54, a map database (map DB) 55, and an image processing circuit 56.

The CPU 51, the memory 52, the location DB 53, the communication circuit 54, the map DB 55, and the image processing circuit 56 are connected to each other through a communication bus 57 and are thus able to exchange data with each other.

The CPU 51 is a signal processing circuit (computer) to control the operation of the operation management device 50. The CPU 51 is typically a semiconductor integrated circuit.

The memory 52 is a volatile storage device to store a computer program to be executed by the CPU 51. The memory 52 may also be used as a working memory when the CPU 51 performs computations.

The location DB 53 stores location data indicative of each location that may be a destination for each AGV 10. The location data may be represented, for example, by coordinates virtually set in a factory by an administrator. The location data is determined by the administrator.

The communication circuit 54 performs wired communication compliant with, for example, Ethernet (registered trademark) standards. The communication circuit 54 is connected by wire to the access points 2 (FIG. 13) and is thus able to communicate with the AGV 10 through the access points 2. Through the bus 57, the communication circuit 54 receives, from the CPU 51, data to be transmitted to the AGV 10. The communication circuit 54 transmits data (or notification), which has been received from the AGV 10, to the CPU 51 and/or the memory 52 through the bus 57.

The map DB 55 stores data on maps of the inside of, for example, a factory where each AGV 10 travels. When the maps each have a one-to-one corresponding relationship with the location of an associated one of the AGVs 10, the data may be in any format. The maps stored, for example, in the map DB 55 may be maps generated by CAD.

The location DB 53 and the map DB 55 may be generated on a non-volatile semiconductor memory, a magnetic storage medium, such as a hard disk, or an optical storage medium, such as an optical disc.

The image processing circuit 56 is a circuit to generate data on an image to be presented on a monitor 58. The image processing circuit 56 is operated exclusively when the administrator operates the operation management device 50. In the present example embodiment, we will not go into any further details on this point. The monitor 58 may be integral with the operation management device 50. The CPU 51 may perform the processes to be performed by the image processing circuit 56.

In the foregoing example embodiments, an AGV that travels in a two-dimensional space (e.g., on a floor surface) has been described by way of example. The present disclosure, however, may be applicable to a vehicle that moves in a three-dimensional space, such as a flying vehicle (e.g., a drone). In the case where a drone generates a map of a three-dimensional space while flying, a two-dimensional space can be extended to a three-dimensional space.

The example embodiments of the present disclosure described above may be implemented by a system, a method, an integrated circuit, a computer program, or a storage medium. Alternatively, the example embodiments of the present disclosure described above may be implemented by any combination of a system, a device, a method, an integrated circuit, a computer program, and a storage medium.

Vehicles according to example embodiments of the present disclosure may be suitably used to move and convey articles (e.g., cargo, components, and finished products) in places, such as, factories, warehouses, construction sites, distribution centers, and hospitals.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A vehicle which travels from a first position through a second position to a third position, the vehicle comprising:
   an external sensor to scan an environment so as to periodically output scan data;
   a storage to store an environmental map; and
   a location estimation device configured to read the environmental map from the storage, and to match the scan data against the environmental map by using an iterative closest point algorithm to estimate a location and an attitude of the vehicle at the third position; wherein
   the location estimation device determines predicted values of a location and an attitude of the vehicle at the third position in accordance with a history of estimated locations and estimated attitudes of the vehicle obtained by the location estimation device while the vehicle travels from the first position to the second position, the predicted values being used as initial values of the iterative closest point algorithm; and
   the location estimation device determines a rate of change in estimated locations and estimated attitudes of the vehicle in the second position in accordance with the history of estimated locations and estimated attitudes of the vehicle obtained by the location estimation device while the vehicle travels from the first position to the second position, and uses the rate of change to determine the predicted values of the location and the attitude of the vehicle in the third position.

2. The vehicle according to claim 1, further comprising one of an omnidirectional wheel, a two-legged walking device, and a multi-legged walking device.

3. The vehicle according to claim 1, further comprising a display to present, using at least one of an image and a sound, at least one of the estimated location and the estimated attitude of the vehicle at the third position.

4. The vehicle according to claim 3, further comprising a navigation device to guide a user through a path in accordance with a destination and the estimated location and the estimated attitude of the vehicle at the third position.

* * * * *